(12) United States Patent
Happel

(10) Patent No.: US 10,384,956 B1
(45) Date of Patent: *Aug. 20, 2019

(54) RESTRICTIVE UP FLOW MEDIA FILTER WITH SERVICING SYSTEM

(71) Applicant: Suntree Technologies Holdings, LLC, Cocoa, FL (US)

(72) Inventor: Tom Happel, Cocoa, FL (US)

(73) Assignee: Oldcastle Infrastructure, Inc., Auburn, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/658,864

(22) Filed: Jul. 25, 2017

Related U.S. Application Data

(63) Continuation-in-part of application No. 15/639,685, filed on Jun. 30, 2017, now Pat. No. 10,202,285, and
(Continued)

(51) Int. Cl.
*E03F 5/14* (2006.01)
*B01D 21/24* (2006.01)
(Continued)

(52) U.S. Cl.
CPC .......... *C02F 1/004* (2013.01); *B01D 21/0012* (2013.01); *B01D 21/2472* (2013.01);
(Continued)

(58) Field of Classification Search
CPC ............ B01D 21/0012; B01D 21/2472; B01D 24/04; B01D 24/263; B01D 24/4631; E03F 5/14
(Continued)

(56) References Cited

U.S. PATENT DOCUMENTS 904,389 A * 11/1908 White ..................... C02F 3/327
210/265
1,398,285 A * 11/1921 Tanner ............... B01D 24/4631
210/265
(Continued)

FOREIGN PATENT DOCUMENTS

CA          2455239          7/2005

*Primary Examiner* — Christopher Upton
(74) *Attorney, Agent, or Firm* — Brian S. Steinberger; Hilary F. Steinberger; Law Offices of Brian S. Steinberger, P.A.

(57) ABSTRACT

Vaults, boxes, chambers, systems, and methods of treatment systems to capture pollutants from storm water runoff and prevent the conveyance of these pollutants from entering a receiving water body or landscape area, which is designed to be a part of a local permanent storm water drainage infrastructure. The system enhances the removal efficiency of almost any type of filtration media by increasing contact time between storm water runoff and the media, and also offers an easy and inexpensive method for serving the media, without having to remove or replace the media. A media filter can include a bottom screen, a media layer, and at least one top lid that can be opened to allow for backwashing of the media layer without removing the media layer from the filter. A servicing system can include pivotal spray heads to pivot to parallel positions over a sloped floor to flush debris toward easy to reach locations to be vacuumed, and vertical spray heads which can break up debris bridges.

20 Claims, 16 Drawing Sheets

Related U.S. Application Data a continuation-in-part of application No. 14/288,455, filed on May 28, 2014, now abandoned.

(60) Provisional application No. 62/506,188, filed on May 15, 2017, provisional application No. 61/828,958, filed on May 30, 2013.

(51) Int. Cl.
  *B01D 24/26* (2006.01)
  *C02F 1/00* (2006.01)
  *C02F 1/40* (2006.01)
  *C02F 1/28* (2006.01)
  *C02F 3/06* (2006.01)
  *B01D 24/46* (2006.01)
  *B01D 21/00* (2006.01)
  *C02F 103/00* (2006.01)
  *C02F 3/00* (2006.01)

(52) U.S. Cl.
  CPC ....... *B01D 24/263* (2013.01); *B01D 24/4621* (2013.01); *B01D 24/4631* (2013.01); *C02F 1/28* (2013.01); *C02F 1/40* (2013.01); *C02F 3/06* (2013.01); *E03F 5/14* (2013.01); *C02F 2003/001* (2013.01); *C02F 2103/001* (2013.01); *C02F 2303/16* (2013.01)

(58) Field of Classification Search
  USPC ......... 210/747.2, 747.3, 793, 801, 803, 804, 210/170.03, 265, 275, 281, 299, 305, 311
  See application file for complete search history.

(56) References Cited

U.S. PATENT DOCUMENTS

| | | | |
|---|---|---|---|
| 2,010,540 A | 8/1935 | Evans | |
| 4,024,881 A | 5/1977 | Weiland | |
| 4,913,819 A | 4/1990 | Patterson | |
| 5,114,274 A | 5/1992 | Heiler | |
| 5,176,838 A | 1/1993 | Chin | |
| 5,498,331 A | 3/1996 | Monteith | |
| 6,125,865 A | 10/2000 | Cochrane | |
| 6,270,663 B1 | 8/2001 | Happel | |
| 6,428,692 B2 | 8/2002 | Happel | |
| 6,797,162 B2 | 9/2004 | Happel | |
| 6,869,525 B1 | 3/2005 | Happel | |
| 6,979,148 B2 | 12/2005 | Happel | |
| 7,153,417 B2 | 12/2006 | Happel | |
| 7,270,747 B2 | 9/2007 | Happel | |
| 7,291,262 B2 * | 11/2007 | Matsui | E03F 5/14 210/170.03 |
| 7,294,256 B2 | 11/2007 | Happel | |
| 7,549,820 B1 | 6/2009 | Happel | |
| 7,824,551 B2 | 11/2010 | Wanielista | |
| 7,846,327 B2 | 12/2010 | Happel | |
| 7,955,507 B2 | 6/2011 | Wanielista | |
| 7,959,799 B2 | 6/2011 | Happel | |
| 7,981,283 B2 | 7/2011 | Happel | |
| 8,002,984 B1 | 8/2011 | Wanielista | |
| 8,002,985 B1 | 8/2011 | Wanielista | |
| 8,034,234 B2 | 10/2011 | Happel | |
| 8,034,236 B1 | 10/2011 | Happel | |
| 8,034,237 B2 | 10/2011 | Happel | |
| 8,051,568 B2 | 11/2011 | Moody | |
| 8,083,937 B2 | 12/2011 | Happel | |
| 8,142,666 B1 | 3/2012 | Happel | |
| 8,153,005 B1 | 4/2012 | Wanielista | |
| 8,216,453 B2 | 7/2012 | Moody | |
| 8,231,780 B2 | 7/2012 | Happel | |
| 8,366,923 B1 | 2/2013 | Happel | |
| 8,393,827 B1 | 3/2013 | Happel | |
| 8,425,150 B1 | 4/2013 | Happel | |
| 8,491,797 B1 | 7/2013 | Happel | |
| 8,622,652 B1 | 1/2014 | Happel | |
| 8,651,767 B1 | 2/2014 | Happel | |
| 8,974,144 B1 | 3/2015 | Happel | |
| 9,068,312 B1 | 6/2015 | Happel | |
| 9,340,965 B2 | 5/2016 | Happel | |
| 9,534,368 B1 | 1/2017 | Happel | |
| 2003/0070977 A1 * | 4/2003 | Anderson | B01D 21/0012 210/301 |
| 2004/0222170 A1 | 11/2004 | Hauge | |
| 2006/0086676 A1 | 4/2006 | Smith | |
| 2008/0006304 A1 | 1/2008 | Treherne | |
| 2012/0073675 A1 | 3/2012 | Dupuis | |
| 2014/0102479 A1 | 4/2014 | Steffen | |
| 2015/0265946 A1 * | 9/2015 | Hur | B01D 21/2472 210/533 |

* cited by examiner

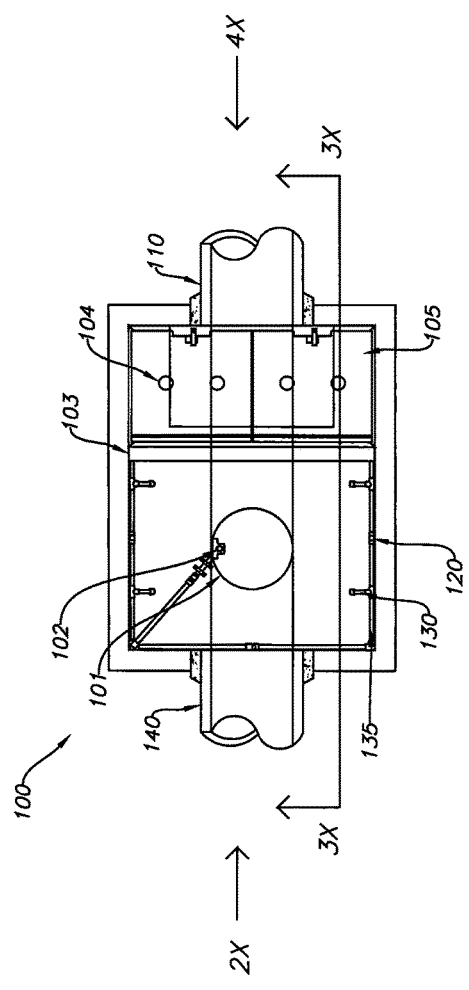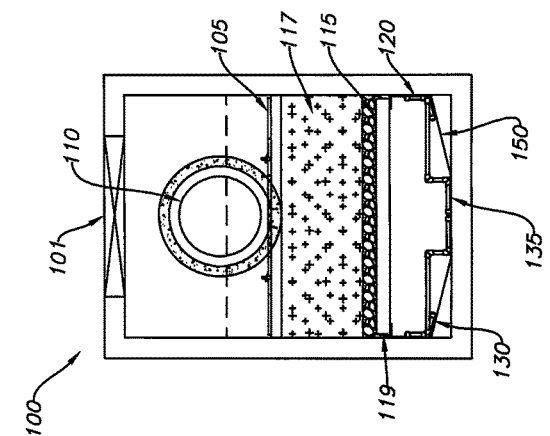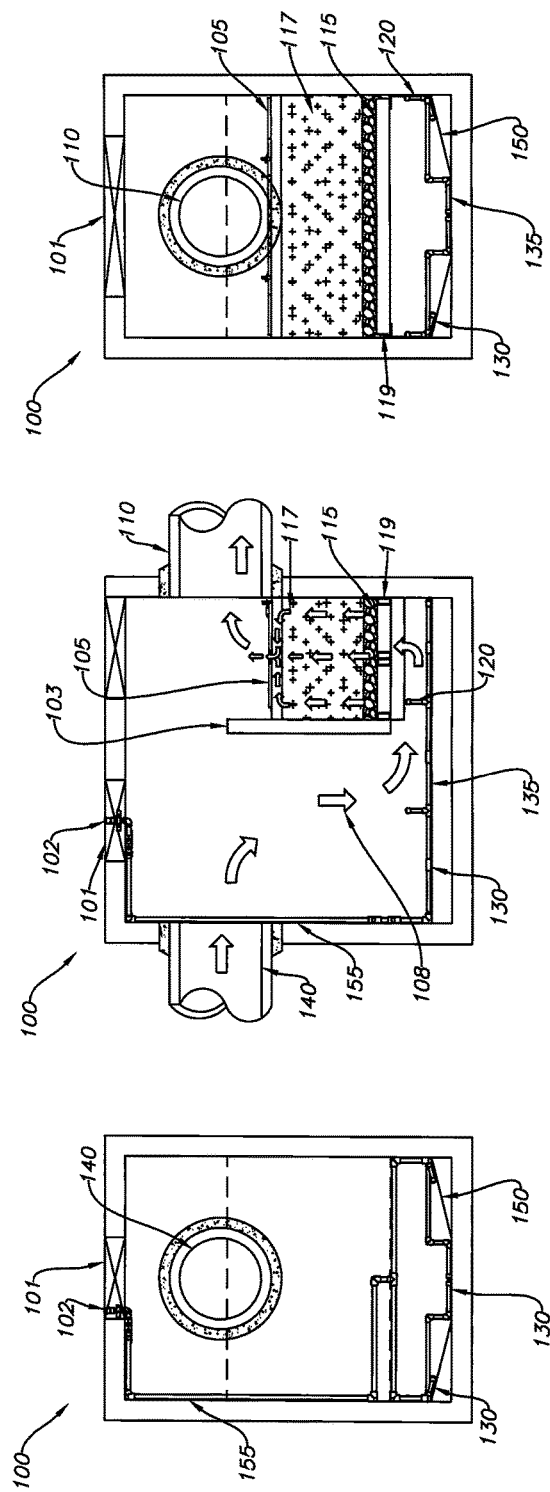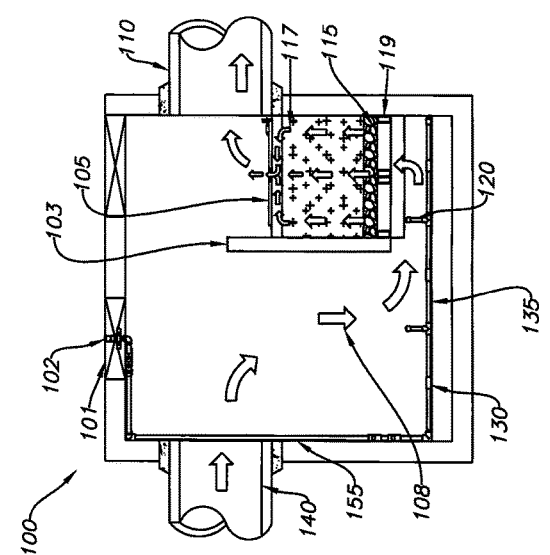

US 10,384,956 B1

RESTRICTIVE UP FLOW MEDIA FILTER WITH SERVICING SYSTEM

CROSS REFERENCE TO RELATED APPLICATIONS

This application is a Continuation In Part of U.S. patent application Ser. No. 15/639,685 filed Jun. 30, 2017, now allowed, which claims the benefit of priority to U.S. Provisional Patent Application Ser. No. 62/506,188 filed May 15, 2017, and this application is a Continuation In Part of U.S. patent application Ser. No. 14/288,455 filed May 28, 2014, now abandoned, which claims the benefit of priority to U.S. Provisional Application Ser. No. 61/828,958 filed May 30, 2013. The entire disclosure of each of the applications listed in this paragraph are incorporated herein by specific reference thereto.

FIELD OF INVENTION

This invention relates to water detention and treatment, and in particular to vaults, boxes, systems, and methods of treatment systems to capture pollutants from storm water runoff and prevent the conveyance of these pollutants from entering a receiving water body or landscape area, which is designed to be a part of a local permanent storm water drainage infrastructure, where the system enhances the removal efficiency of almost any type of filtration media by increasing contact time between storm water runoff and the media, and also offers an easy and inexpensive method for serving the media, without having to remove or replace the media.

BACKGROUND AND PRIOR ART

Since the passage of the Clean Water Act in 1972 the federal government through the Environmental Protection Agency (EPA) has mandated progressively tighter controls over the quantities of pollutants and contaminants that are allowed to be released into our nation's waters. These progressively tighter mandates also encompass control of peak flows and/or volumes and the rate at which they can be discharged into existing water ways or drainage infrastructures. These resulting mandates and controls have given birth to new programs and procedures collectively referred to as storm water management.

Devices, systems and procedures that remove or reduce the pollutants and contaminates and/or control peak flows and volumes are often referred to as best management practices (BMPs). The BMPs can utilize natural, artificial or man-made techniques, and even combinations of either and/or both. Some examples of these BMPs include trash filters, sedimentation basins, retention and detention ponds, wetlands, infiltration trenches, grass swales, various types of media filters, and various types of natural filter systems including sand filters, and aggregate filters including natural and artificial wetlands.

BMPs typically use one or more mechanisms to remove the pollutants and contaminates. These mechanisms include sedimentation, filtration, absorption, adsorption, flocculation, stripping, leaching, bioremediation, and chemical processes including oxidation reduction, ion exchange, and precipitation.

Furthermore, storm water treatment systems can also be classified in relationship to the treatment level in which they are being used. In this respect, the term treatment is generally used to describe the unit processes that are used to reduce the quantities of pollutants and containments in storm water runoff.

For example, basic or pre-treatment typically refers to the removal of gross solids, sediments and larger debris through the processes of settling and screening. Enhanced or advanced treatment typically refers to processes or reducing targeted pollutants.

Filtration is a common form of enhanced treatment for storm water. Filtration utilizes a combination of physical, chemical, and biological processes. Types of filtration greatly vary dependent on the media use. Medias can be both inert and/or sorbent and are also strongly linked to natural biological processes that thrive in and/or around the media environment. Advanced filtration techniques especially include chemical and biological processes and generally include, but are not limited to processes that bring storm water in contact with plants including both macrophytes and microphytes. And the plants are both visible and invisible to the naked eye.

The reduction of nutrients that are conveyed via storm water runoff are in the forefront of the various pollutants of concern. For example; the EPA has mandated that the state of Florida reduce the overall pollutant discharge of the state by approximately ⅓. To this end the EPA has established a numeric nutrient criteria for all water bodies of the state for total phosphorus (TP) and total nitrogen (TN). These nutrient numeric values cannot be exceeded within these water bodies of the state. The result of exceeding these numeric values will result with the state of Florida being fined by the EPA.

Common pollutants typically found in storm water flow can include sediment, foliage, litter, nutrients, metals, hydrocarbons, and bacteria. Because pollutants vary significantly in their respective physical characteristics, a variety of techniques are applied to better address difficulties with capturing the pollutants. For example; capturing hydrocarbons, which are typically in a liquid state, require a different technique than capturing litter which are in a solid state.

Storm water treatment systems that make use of filtration media can vary significantly just by making use of different types of filtration media. Understanding that effectiveness will vary for different types of filtration media, has filtration media functions by combining the processes of physical filtration, sorbent or reactive surfaces, and biological activity.

Physical filtration will physically prevent the conveyance of solids, sorbent or reactive surfaces will chemically bond to the pollutants, and the biological activity will consume pollutants. Physical filtration whether by use of a filtration media or a screen can be an effective technique for capturing solids. Contained within and attached to the solids are a wide spectrum of pollutants of concern that can range from nutrients, to litter, to bacteria. A difficulty with physical filtration is that the collected solids can become so numerous that the rate of filtration is slowed to an ineffective flow rate. Servicing of the filtration media is typically required, and the servicing often requires the media to be replaced as a part of servicing.

Filtration media will have sorbent or reactive surfaces that vary in effectiveness depending on the type of media. For storm water treatment applications, the media is granular in shape. However, the reactivity of the media surfaces is limited by the number of receptors on the surface of the media.

Making use of media that has a lot of surface area will increase the number of available receptors. A common method to increasing the surface area of the media is using media that is small in granular size. However, the smaller the granular size of the media the more likely the media will be to bind due to the collection of solids within the media. In addition, the receptors can be binded by solids which prevent the water flow from reaching the surface of the media granules.

The biological activity of a filtration media is found within what is referred to the biofilm on the media. Microorganisms will colonize the surfaces of the media and consume certain pollutants of concern. For example; a very effective technique for nutrient capture is to rely on the biofilm to consume the nutrient pollutant load. However, a difficulty with having a biofilm consume the nutrients is that the biofilm will require adequate time to consume the nutrients. A longer time frame in which the water is in contact with the biofilm will yield greater nutrient uptake. A media treatment system that can affect greater retention time within the media will achieve greater removal efficiencies.

Thus, the need exists for solutions to the above problems with the prior art.

SUMMARY OF THE INVENTION

A primary objective of the present invention is to provide vaults, boxes, systems, and methods of treatment systems to capture pollutants from storm water runoff and prevent the conveyance of these pollutants from entering a receiving water body or landscape area, which is designed to be a part of a local permanent storm water drainage infrastructure.

A secondary objective of the present invention is to provide vaults, boxes, systems, and methods of treatment systems to capture pollutants from storm water runoff and prevent the conveyance of these pollutants, where the system enhances the removal efficiency of almost any type of filtration media by increasing contact time between storm water runoff and the media, and also offers an easy and inexpensive method for serving the media, without having to remove or replace the media.

A third objective of the present invention is to provide vaults, boxes, systems, and methods of treatment systems to capture pollutants from storm water runoff and prevent the conveyance of these pollutants from entering a receiving water body or landscape area, which offers an easy and inexpensive method for serving the media, without having to remove or replace the media.

Vaults, boxes, systems, and methods of a flow restricted storm water filtration system prevents the conveyance of a wide spectrum of pollutants from being conveyed to a receiving body of water or landscape area. Typically, the invention will be housed in a vault and will incorporate multiple stages and processes for the treatment of water shed from an area as a result of rain. This system will enable the settling of larger solids in a lower settling chamber, flow water through a media bed in an upflow configuration, and be able to bypass flows that exceed the rate of flow passing through the media.

At the top of the upflow filter orifices of an engineered size will enable greater contact time between the water flow and the media to enhance removal efficiency of pollutants.

A specialized spray system along the floor of the invention will assist with the removal of solids in the lower settling chamber. Lids on top of the upflow filter can be opened to enable the filtration media to be backflushed by service technicians from outside the invention.

Water flow can enter into the vault through an inflow opening one or more of the sides of the vault, and/or through the top of the vault. The linear velocity of the water entering the vault will be significantly reduced which will allow solids to settle into the lower settling chamber or chambers. A structure within the vault will divert water flow downward toward a zone underneath an upflow filter. Water will flow upward through the upflow filter at a rate that is regulated by the orifices at the top of the upflow filter. After the water flow exits out the top of the upflow filter it will exit the treatment vault.

During servicing of the flow restricted storm water filtration system solids will be removed from the vault by a vacuum truck. A specialized spray system along the floor of the vault will enable quick and easy removal of these solids. The lids with orifices across the top of the upflow filter can be hinged and can be opened during servicing to backflush solids from within the filtration media into the settling zone of vault where the spray servicing system will direct the solids toward the vacuum of the service truck.

Further objects and advantages of this invention will be apparent from the following detailed description of the presently preferred embodiments which are illustrated schematically in the accompanying drawings.

BRIEF DESCRIPTION OF THE FIGURES

First Embodiment Upflow Media Filter with Sloped Floors and Hydroslide

FIG. 1 is a top view of the upflow media filter baffle box/vault with sloped floors and hydroslide.

FIG. 2 shows an inflow end view of the upflow media filter baffle box/vault of FIG. 1 along arrow 2X with flow directional arrows.

FIG. 3 is a side cross-sectional view of the upflow media filter baffle box/vault of FIG. 1 along arrows 3X.

FIG. 4 is an outflow view of the upflow media filter baffle box/vault of FIG. 1 along arrow 4X.

Second Embodiment Upflow Media Filter with Plastic Lids with Screened Orifice Opened for Servicing

Third Embodiment Upflow Media Filter with Floating Skimmer

Figure 16:
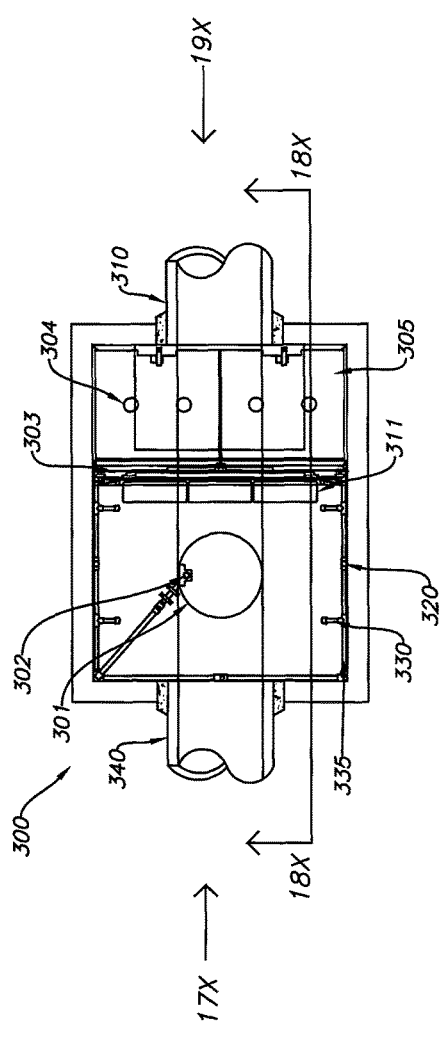

FIG. 16 is a top view of the upflow media filter baffle box/vault of FIG. 1 with floating skimmer.

Figure 18:
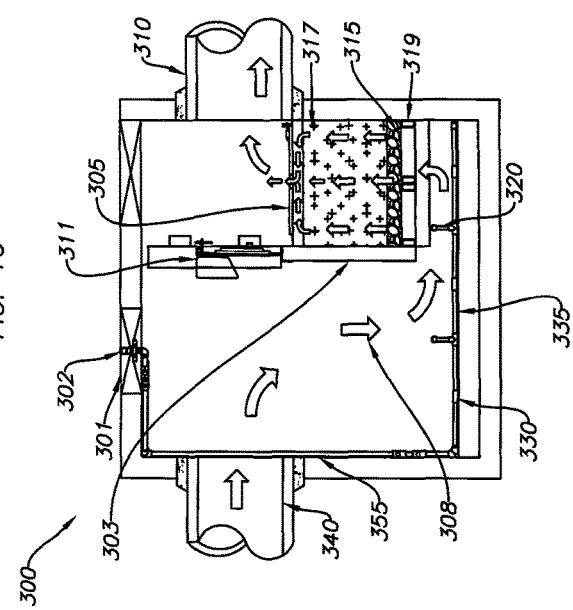
Figure 17:
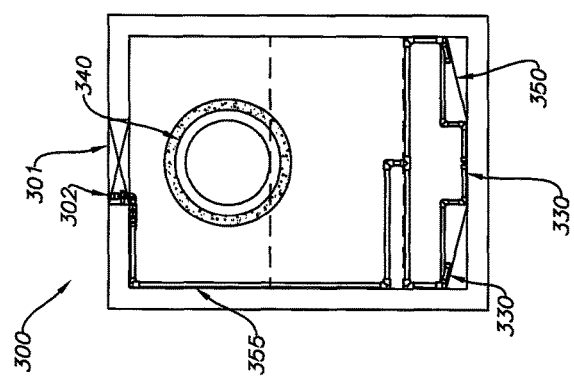

FIG. 17 is an inflow view of the upflow media filter baffle box/vault of FIG. 16 along arrow 17X FIG. 18 is side cross-sectional view of the upflow media filter baffle box/vault of FIG. 16 along arrow 18X.

Figure 19:
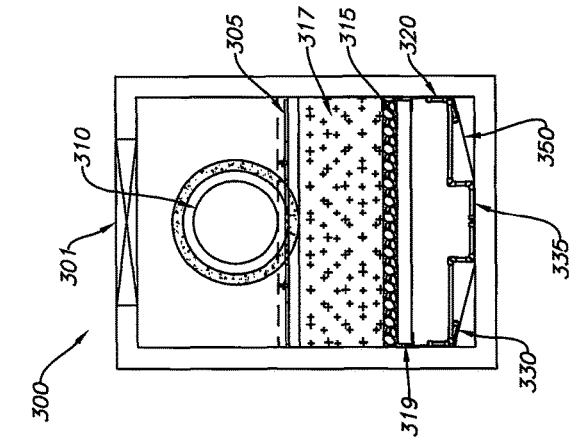

FIG. 19 is an outflow view of the inflow media filter baffle box/vault of FIG. 16 along arrow 19X.

Figure 20:
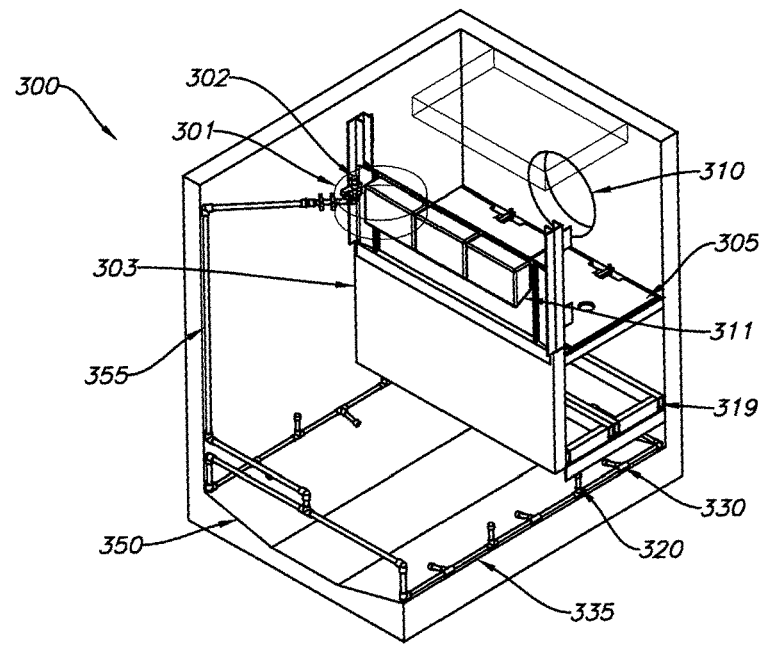

FIG. 20 is an upper partial front right perspective view of inflow media filter baffle box/vault of FIG. 16 without gravel/rock layer, media and screen.

Figure 21:
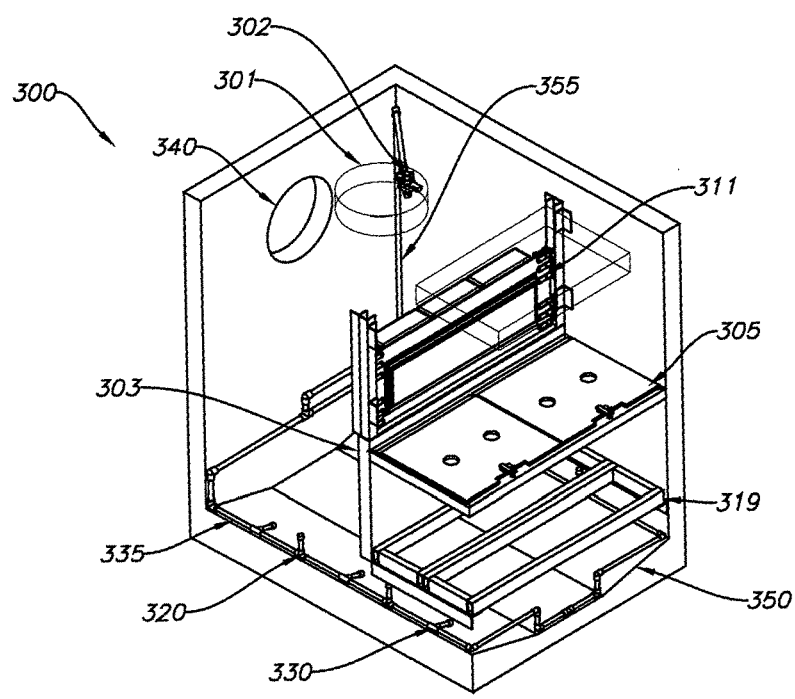

FIG. 21 is an upper partial rear left perspective view of inflow media filter baffle box/vault of FIG. 16 without gravel/rock layer, media and screen.

Figure 22:
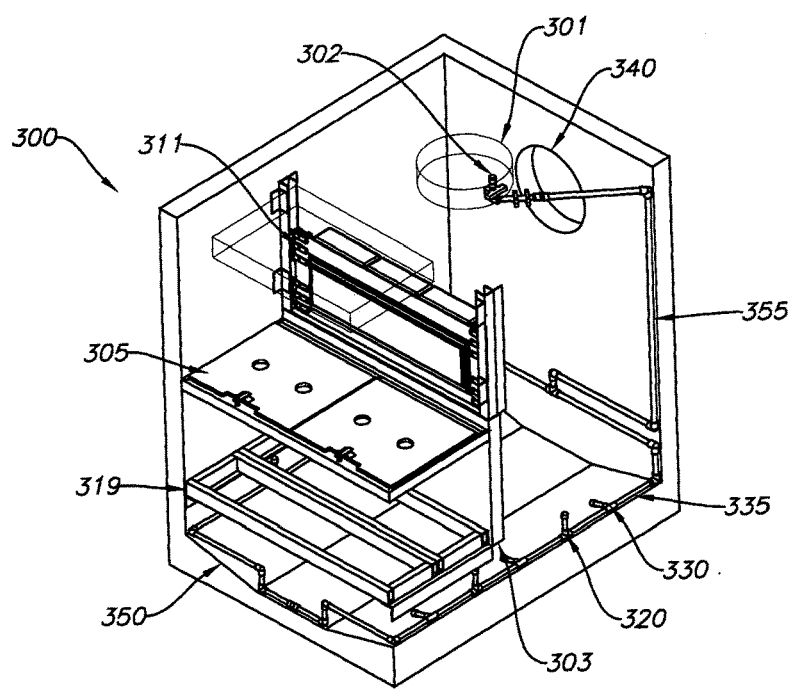

FIG. 22 is an upper partial rear right perspective view of inflow media filter baffle box/vault of FIG. 16 without gravel/rock layer, media and screen.

Figure 23:
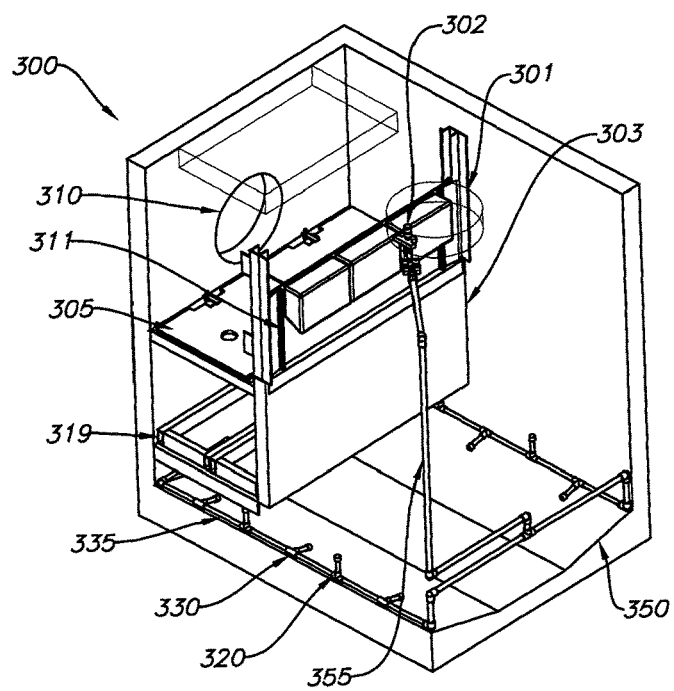

FIG. 23 is an upper partial front left perspective view of inflow media filter baffle box/vault of FIG. 16 without gravel/rock layer, media and screen.

Lid Lock Detail

Figure 24:
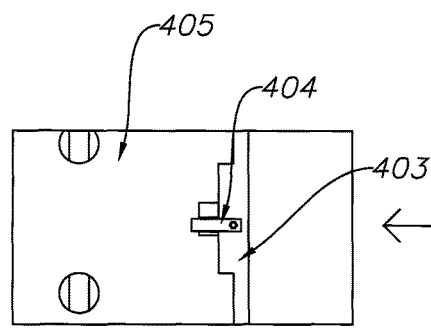

FIG. 24 is an enlarged partial top view of the lid lock components of the previous embodiments.

Figure 25:
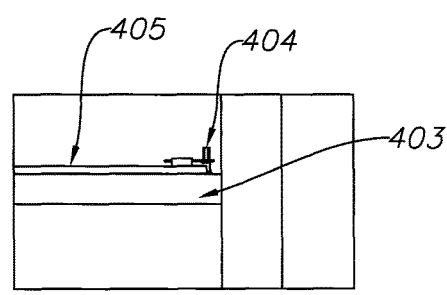

FIG. 25 is a front view of the lid lock components of FIG. 24 along arrow 25X.

Figure 26:
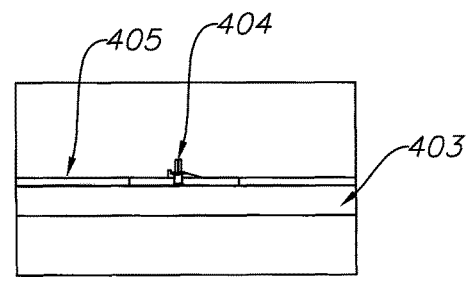

FIG. 26 is a side view of the lid lock components of FIG. 24 along arrow 26X.

Figure 27:
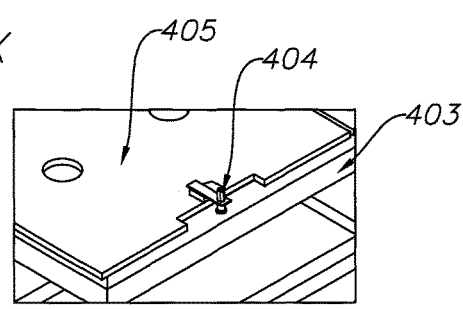

FIG. 27 is a top partial front right view of the lock components of FIG. 24 in a lock position.

Figure 28:
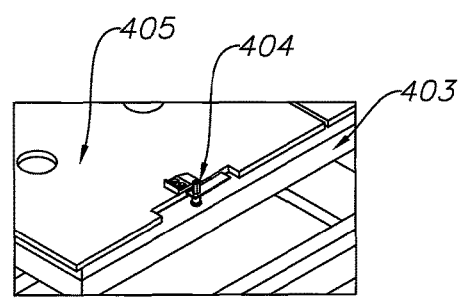

FIG. 28 is another top partial front right view of the lock components of FIG. 27 in an unlocked position.

Aiming Lever Detail

Figure 29:
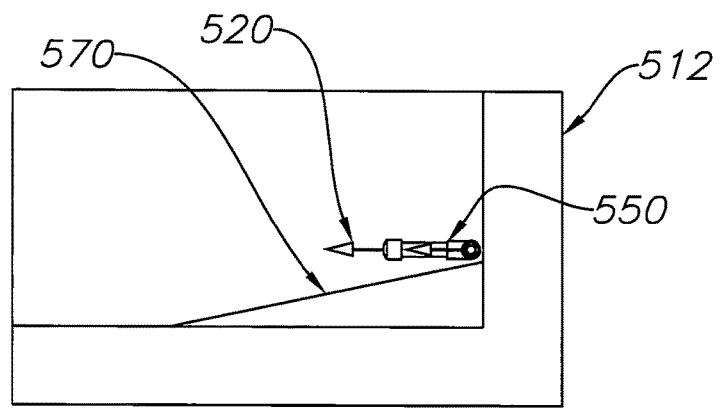

FIG. 29 is an enlarged partial side view of the aiming lever with spray bar of the preceding FIGURES used to assist in installation of spray bars along corners of the floor.

Figure 30:
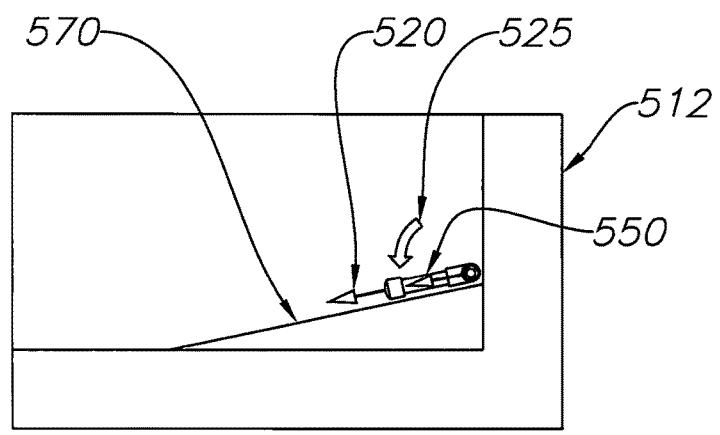

FIG. 30 is another view of the lever and spray bar of FIG. 29 rotated down so the spray direction is parallel with the sloped floor.

Knife Cutting Detail

Figure 31:
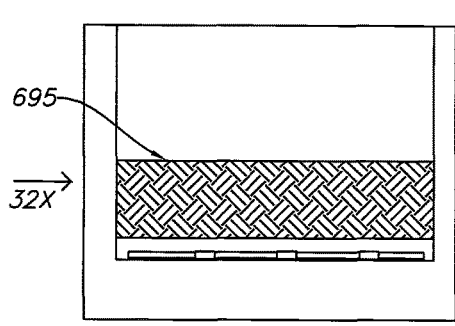

FIG. 31 is a front side view of the inflow medial filter baffle box/vault along the floor showing the sediment debris forming a bridge in the baffle box/vault.

Figure 32:
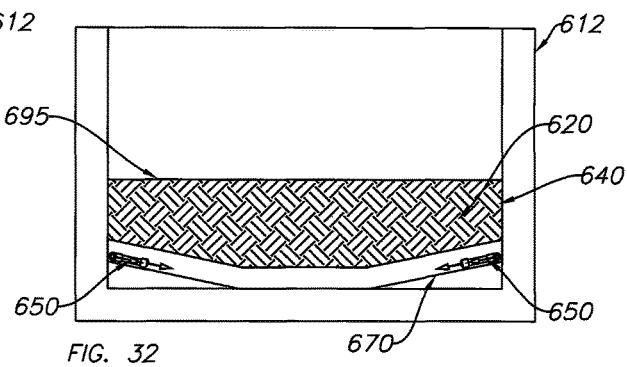

FIG. 32 is a side view of the box/vault of FIG. 32 of the sediment debris bridge above the sloped floor with the lever and spray bars rotated down so the spray direction is parallel with the sloped floor.

Figure 33:
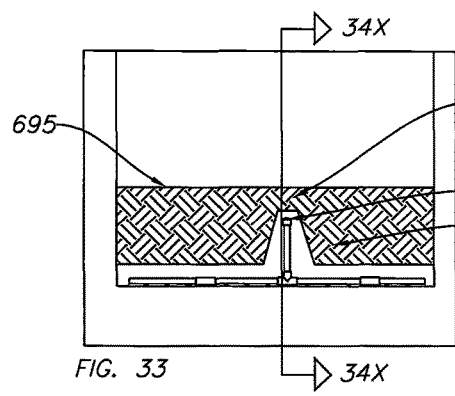

FIG. 33 is another view of FIG. 31 with a vertical spray knife perpendicular to the floor spray bars spraying into the bridged sediment/debris creating a channel and a reduced bridge section location above the channel.

Figure 34:
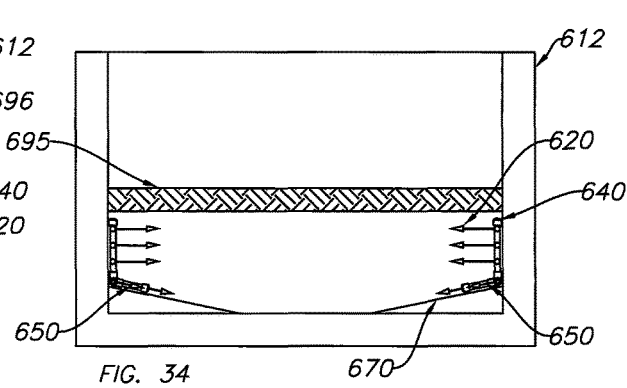

FIG. 34 is a cross-sectional view of FIG. 33 along arrows 34X.

Figure 35:
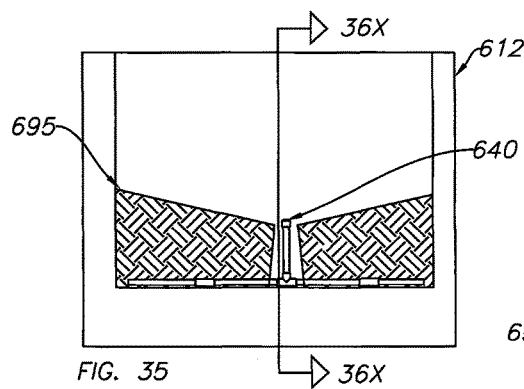

FIG. 35 is another view of FIG. 33 after the weakened section location above the channel breaks away allowing the sediment/debris to fall to the lower spray bars.

Figure 36:
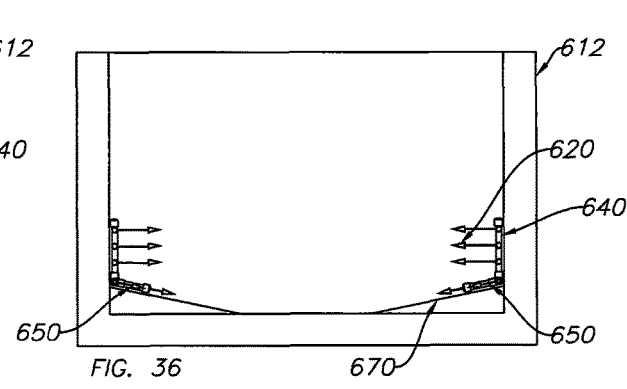

FIG. 36 is a cross-sectional view of FIG. 35 along arrows 36X.

Fourth Embodiment Upflow Media Filter with Screen System

Figure 37:
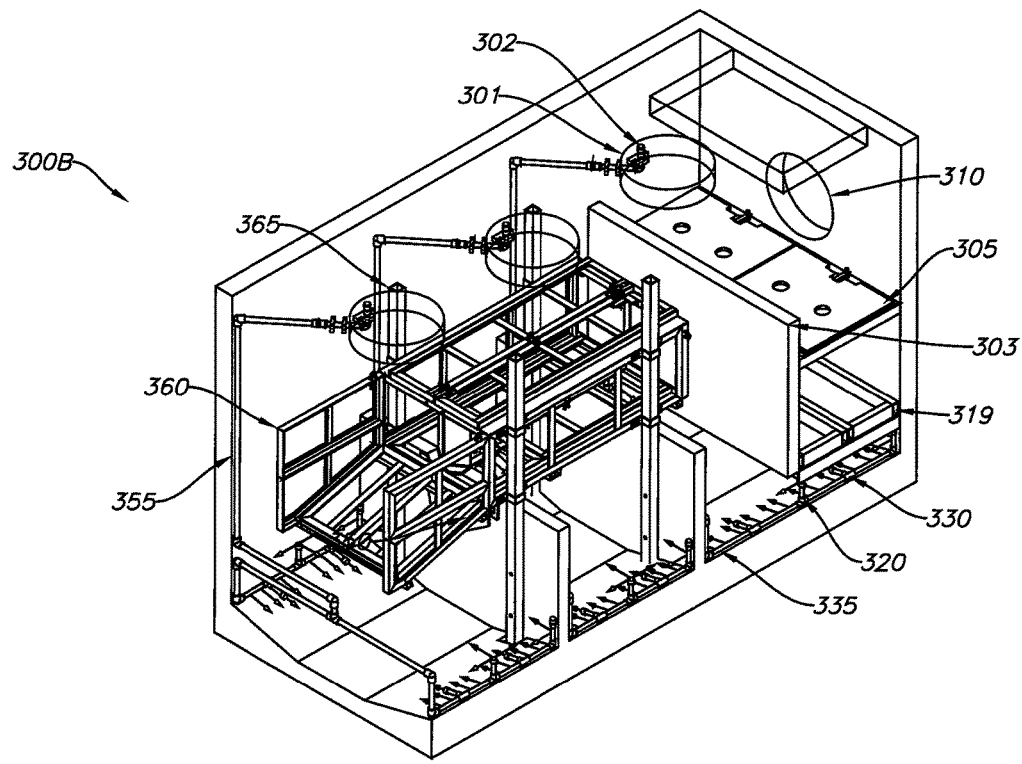

FIG. 37 is an upper partial perspective front right view of the media filter box/vault of FIG. 1 with screen system and static baffle skimmer.

Figure 38:
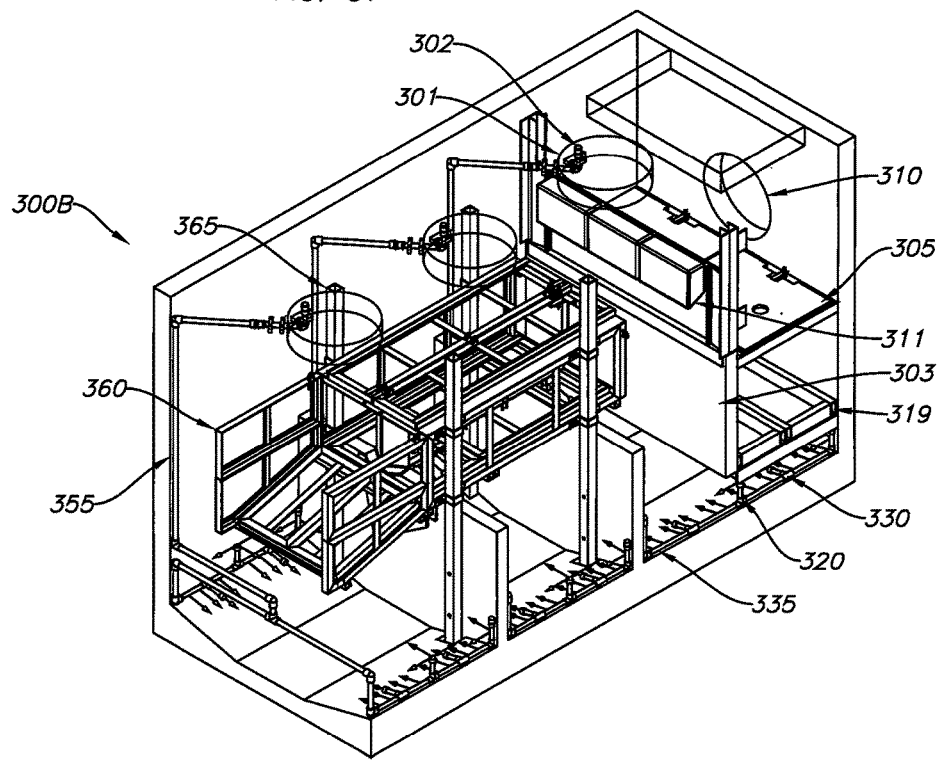

FIG. 38 is an upper partial perspective front right view of the media filter box/vault of FIG. 1 with screen system and floating skimmer.

Figure 39:
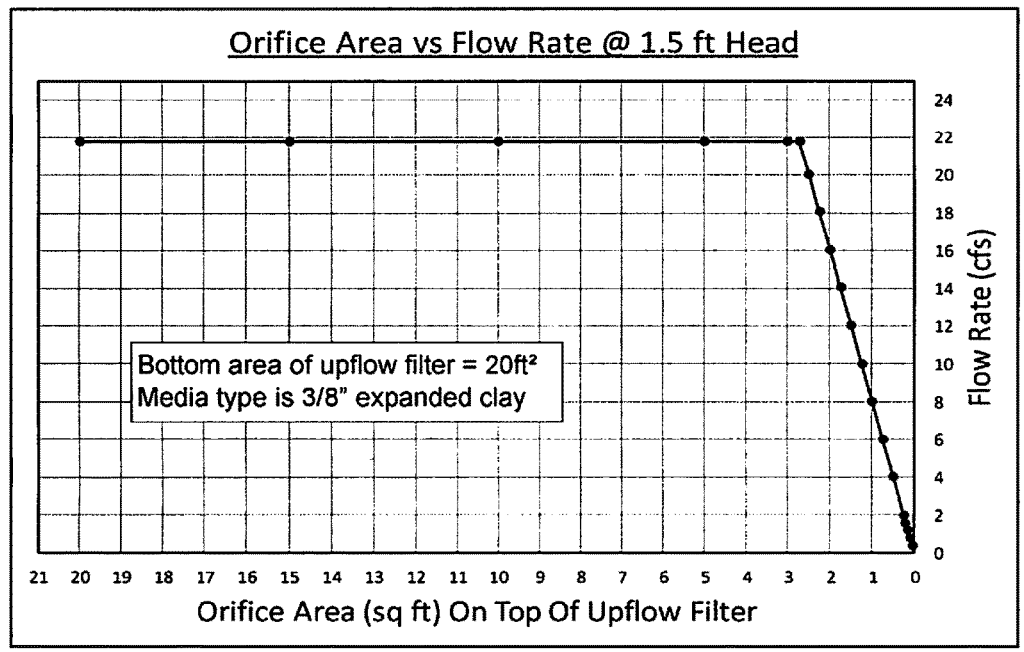

FIG. 39 is a graph that plots the orifice area on top of the upflow filter vs the total potential flow of the upflow filter.

Figure 40:
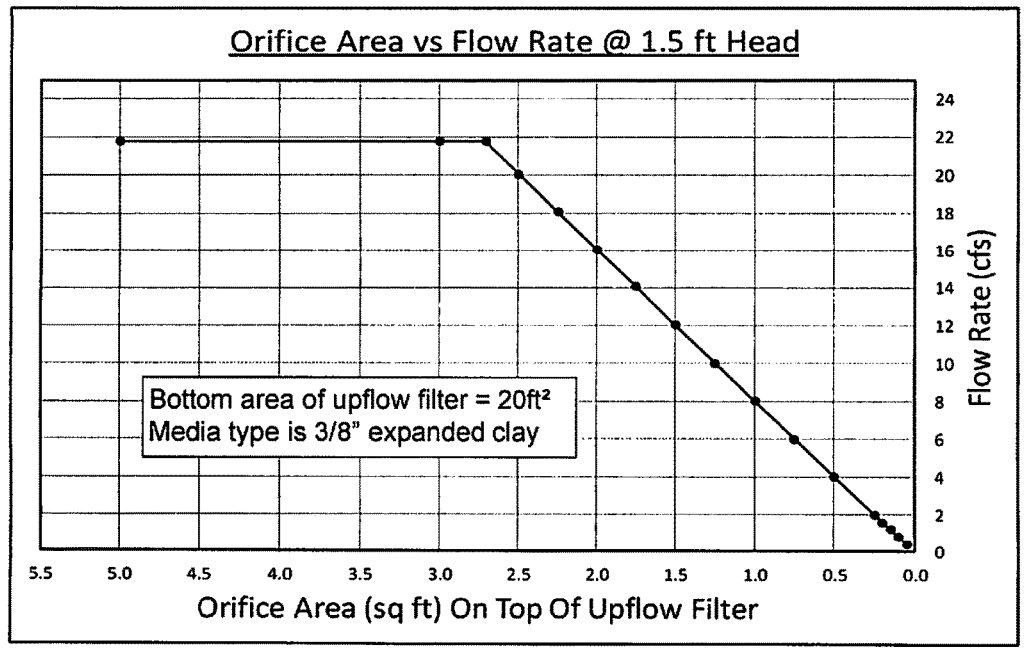

FIG. 40 is another graph of FIG. 39 that plots the orifice area on top of the upflow filter vs the total potential flow of the upflow filter with the x axis truncated.

Figure 41:
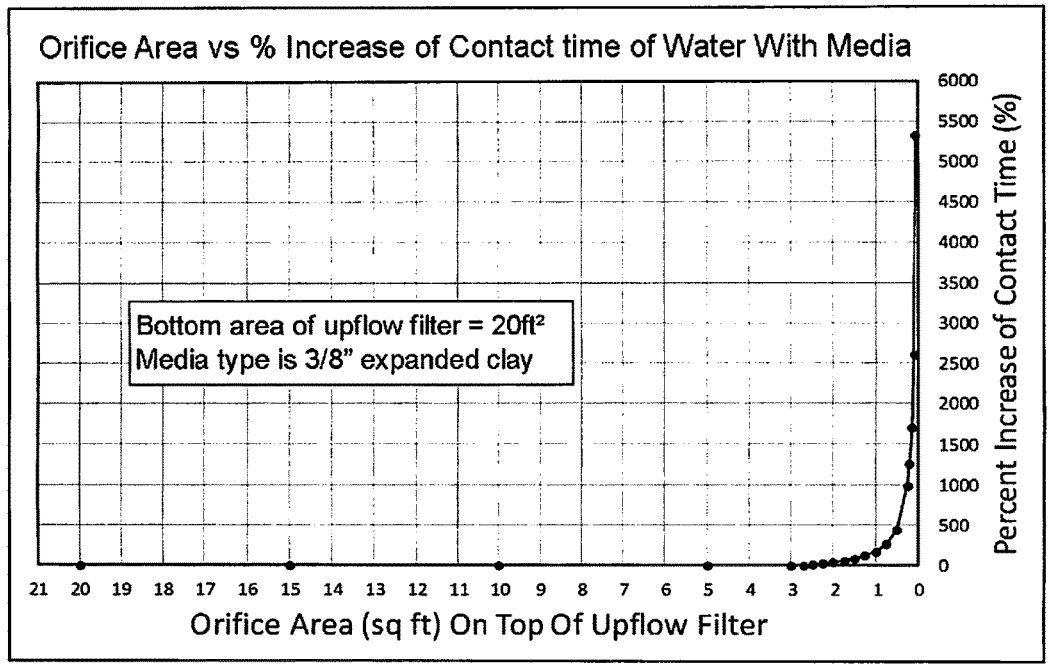

FIG. 41 is a graph that plots the area of the orifice on top of the upflow filter.

Figure 42:
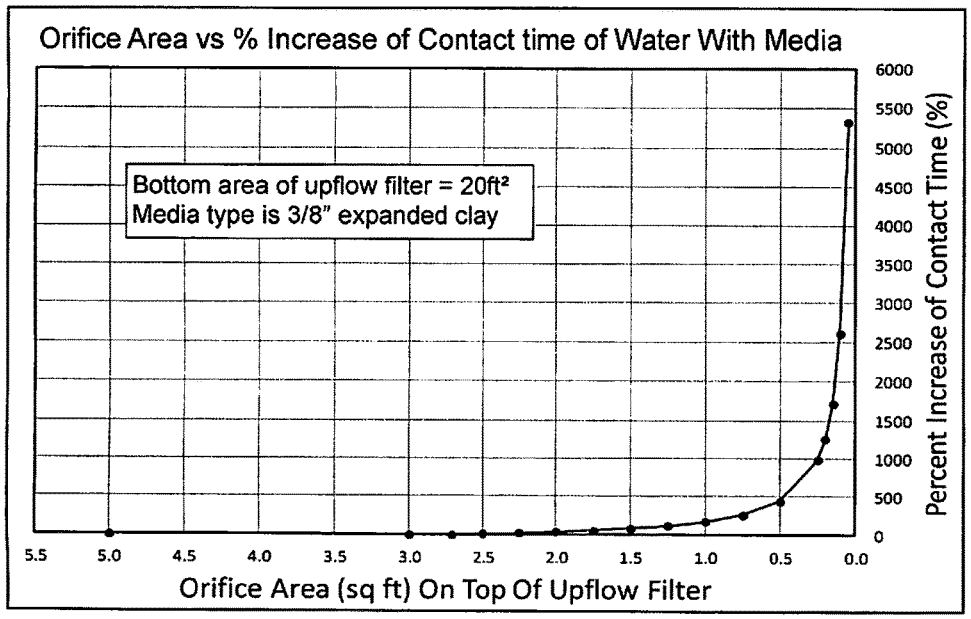

FIG. 42 is another graph of FIG. 41 that plots the area of the orifice on top of the upflow filter with the x axis truncated.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

Figure 5:
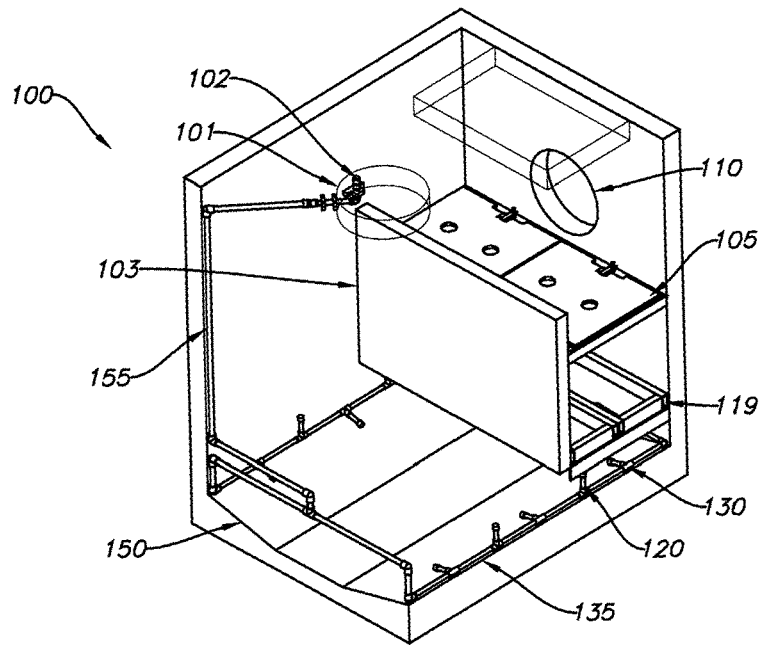
FIG. 5 is an upper partial front right perspective view of the upflow media filter baffle box/vault of FIG. 1.
Figure 6:
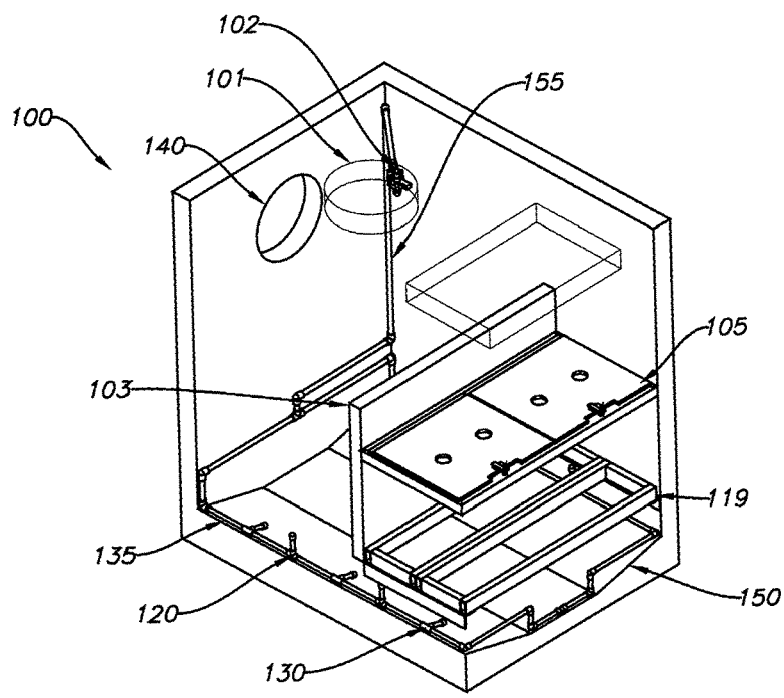
FIG. 6 is an upper partial rear left perspective view of the upflow media filter baffle box/vault of FIG. 1 without gravel/rock layer, media and screen.

100 Upflow media filter box/vault/system
101—access point
102—water connection
103—baffle, diversion barrier
104—flow regulation orifice
105—plastic lids with screened orifice, top lid screen
108—flow direction
110—outflow pipe
115—gravel/rock layer
117—media layer/bed
119—bottom screen
120—spray knife
130—aiming lever
135—spray bar along the floor corners
140—inflow pipe
150—sloped floor
155—water lines
200 box/vault/system
201—access point
202—water connection 203—baffle
204—flow regulation orifice
205—plastic lid with screened orifice(s), top lid/screen
206—Plastic lids with screened orifice open for servicing
207—spray wand and hose used in servicing
209—back flush direction
210—outflow pipe
215—gravel/rock layer
217—media layer/bed
219—bottom screen
220 spray knife
230—aiming lever
235—spray bar along the floor corners
240—inflow pipe
250—sloped floor
255—water lines
300 box/vault/system
301—access point
302—water connection
303—baffle
304—flow regulation orifice(s)
305—plastic lid with screened orifice(s)
308—flow direction
310—outflow pipe
311—floating skimmer
315—gravel rock/layer
317—medial layer/bed
319—bottom screen
320—spray knife
330—aiming lever
335—spray bar along the floor corners
340—inflow pipe
350—sloped floor
355—water lines
360—screen system
365—screen legs
403—lid landing
404—lid lock/latch
405—plastic lid with screened orifice
406 catch
512—vault wall
520—spray direction arrow
525—rotational direction arrow
550—aiming lever
570—sloped floor
612—vault wall
620—spray direction arrow
640—spray knife
650 aiming lever with spray bar
670—sloped floor
695—sediment debris/bridge
696 weakened location First Embodiment Upflow Media Filter with Sloped Floors and Hydroslide FIG. 1 is a top view of the upflow media filter baffle box/vault 100 with sloped floors 150 and hydroslide. FIG. 2 shows an inflow end view of the upflow media filter baffle box/vault 100 of FIG. 1 along arrow 2X with flow directional arrows. FIG. 3 is a side cross-sectional view of the upflow media filter baffle box/vault 100 of FIG. 1 along arrows 3X. FIG. 4 is an outflow view of the upflow media filter baffle box/vault 100 of FIG. 1 along arrow 4X. FIG. 5 is an upper partial front right perspective view of the upflow media filter baffle box/vault 100 of FIG. 1. FIG. 6 is an upper partial rear left perspective view of the upflow media filter baffle box/vault 100 of FIG. 1 without gravel/rock layer 115, media 117, top screen 105 and bottom screen 119.

Figure 7:
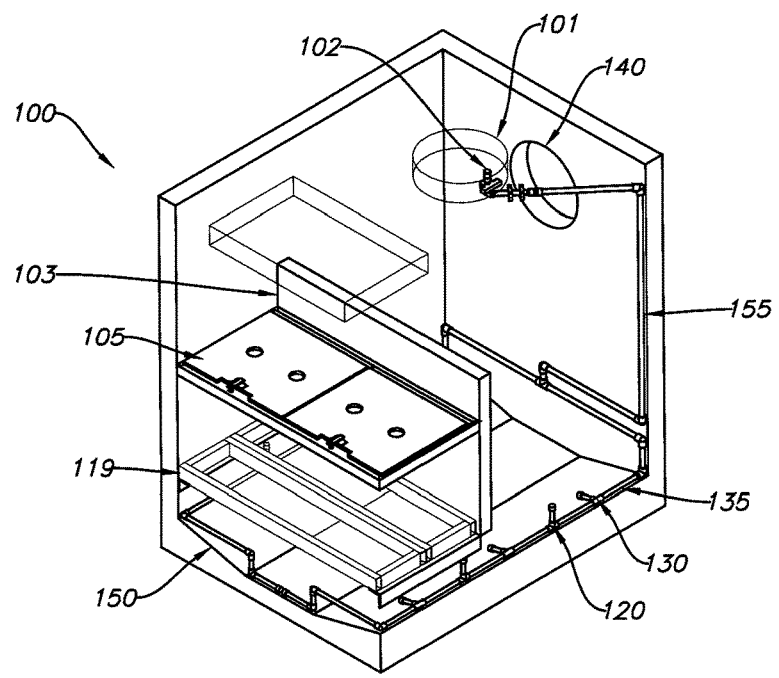
FIG. 7 is an upper partial rear right perspective view of the upflow media filter baffle box/vault of FIG. 1 without gravel/rock layer, media and screen.
Figure 8:
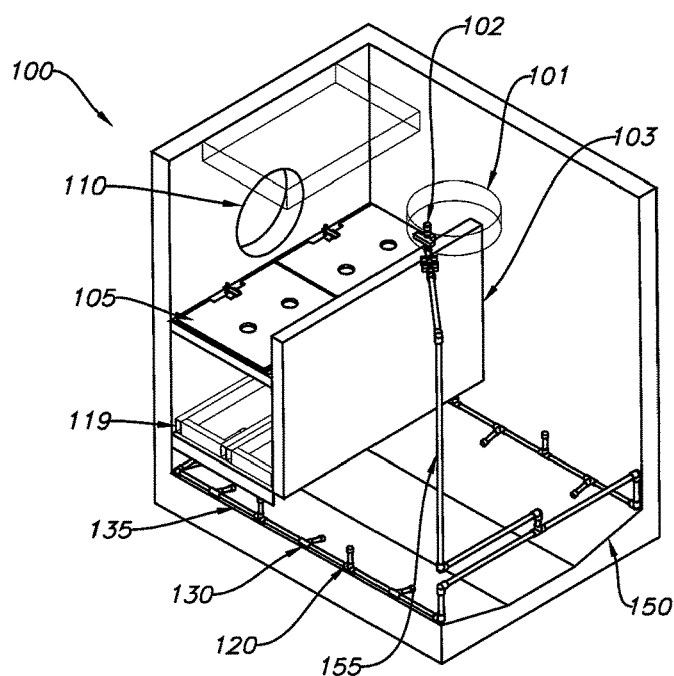
FIG. 8 is an upper partial front left perspective view of the upflow media filter baffle box/vault of FIG. 1 without gravel/rock layer, media and screen.

FIG. 7 is an upper partial rear right perspective view of the upflow media filter baffle box/vault 100 of FIG. 1 without gravel/rock layer 115, media 117, top screen 105 and bottom screen 119. FIG. 8 is an upper partial front left perspective view of the upflow media filter baffle box/vault 100 of FIG. 1 without gravel/rock layer 115, media 117 and screens 105, 119.

Figure 9:
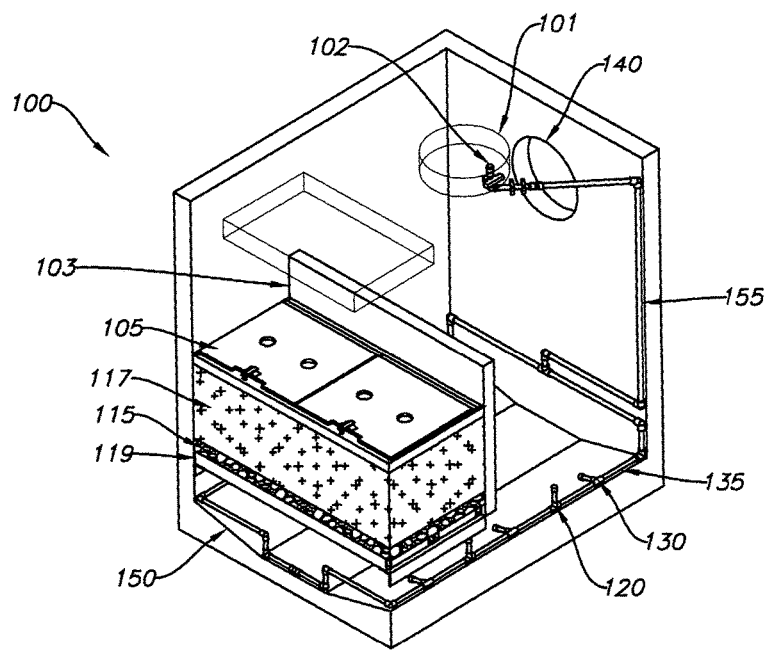
FIG. 9 is an upper partial rear right perspective view of the upflow media filter baffle box/vault of FIG. 1.
Figure 10:
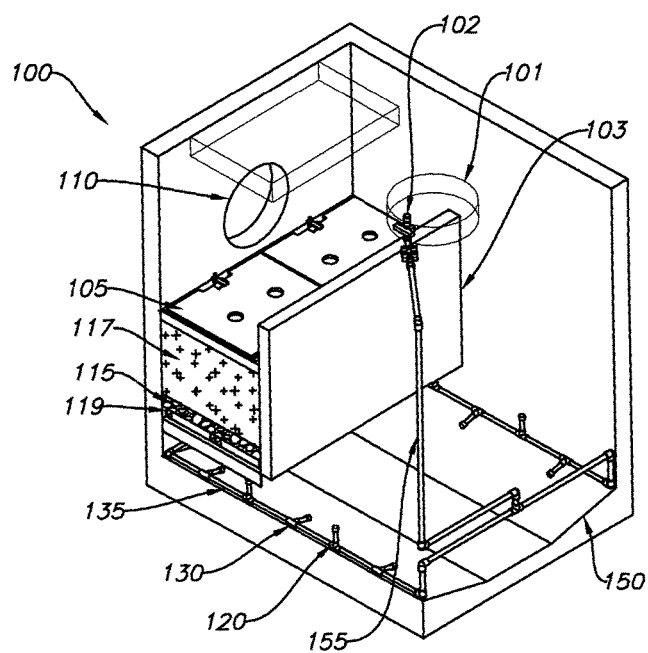
FIG. 10 is an upper partial front left perspective view of the upflow media filter baffle box/vault of FIG. 1.

FIG. 9 is an upper partial rear right perspective view of the upflow media filter baffle box/vault 100 of FIG. 1. FIG. 10 is an upper partial front left perspective view of the upflow media filter baffle box/vault 100 of FIG. 1.

Referring to FIGS. 1-10, inflowing storm water can pass into the vault/box 100 by an inflow pipe 140. A fixed baffle 103 can direct the inflowing storm water downward 108 so as to eventually pass through a media filter which comprises a bottom screen 119, gravel/rock layer 115, and top lid/screen 105, until the cleaned storm water passes out of an outflow pipe 110.

The top lid/screen 105 can have small orifices 104 that will slow down the flow out of the media filter compared to the bottom screen 119.

A hydroslide servicing system which will be further described below has a water connection 102 that can be accessed through an access point 101. Water lines 155 can pass pressurized water down to spray bars 135 along the floor corners and out through aiming levers 130 with spray heads and spray knifes 120.

Settling Zone:

Referring to FIGS. 1-10 a pipe 140 can convey water flow into the box/vault 100 of the flow restricted storm water filtration system 100. The cross-sectional area of conveyance within the box/vault 100 will be substantially greater than that of the inflow pipe 140, resulting in a substantial drop in the linear velocity of the water flow. When the linear velocity of the water flow is reduced the turbulence will also be reduced. The water flow will become calm and the turbulence required to keep solids suspended in the water column will no longer exist. The lack of turbulence inside the box/vault 100 will enable a major portion of the solids to settle to the bottom of the box/vault 100 where the solids will remain until servicing is performed. The space in which solids settle across the bottom of the box/vault 100 is the settling zone. In addition, in between rain events, leaves, grass, and litter that previously had been pressed against the bottom screen 119 of the upflow media filter (comprised of top screen 105, media 117, gravel/rock layer 115 and bottom screen 119) can drop away from the media filter and also settle into the settling zone.

Upflow Filter:

Referring to FIGS. 1-10, between the inflow opening 140 and the outflow opening 110 of the flow restricted storm water filtration system 100 is a diversion barrier 103 that will divert the water flow downward and then horizontal at a lower level within the box/vault 100. The water flow will enter into the bottom of the filter bed through the bottom screen 119 and flow upward. Because the water flow is directed upward through the media bed 117, this configuration of filter is known as an upflow filter.

The bottom of the filter can be permeable and is typically covered by a screen 119 that has openings that are adequately sized to prevent the media 117 from falling through the screen and escaping the media bed. At the top of the upflow filter is a top lid/screen 105 or a plurality of lids that has openings 104 that function as orifices which are engineered to restrict the volume of water flow.

These orifices can also be covered by screen 119 so that the media 117 cannot escape the media bed through the orifices 104. The bottom screen 119 open area is much greater than the open area of the screened orifices 104 in the lids 105. This substantial difference in open area between the bottom screen 119 and top orifices 104 enables the top orifices 104 to regulate the maximum potential flow volume able to pass through the upflow filter. Between the bottom screen 119 and the top lids 105 with orifices 104 is the filtration media 117 which spans the media bed. The filtration media 117 forms a layer that is typically is 1' to 4' thick, depending on the media type and targeted removal efficiency of pollutants.

The types of filtration media 117 that can be used include but are not limited to those described in U.S. Pat. Nos. 7,824,551; 7,955,507; 8,002,984; 8,002,985; and U.S. Pat. No. 8,153,005 to Wanielista et al., which are incorporated by reference.

The filtration media 117 can be contained within the bottom screen 119 and top lid 105 with flow regulation orifices 104. As the water passes through the media sorbent surfaces, physical filtration, and biological activity will act to capture pollutants.

Also, between the top of the filtration media 117 and the bottom of the lids 105 there is a small open space that forms a layer that measures approximately 2" thick. This open space across the top of the media bed 117 enables horizontal conveyance of water flow between the top of media bed 117 and the orifices 104 in the lids. This gap between the top of the media 117 and the bottom of the lids 105 ensures that the orifices in the lids 105 will determine the rate of flow volume passing through the upflow filter.

In addition, the gap between the top of the filtration media 117 and the bottom of the lids 105 will allow the media 117 to shift and move from the upflowing water. This movement will aid with preventing the media 117 from becoming clogged. If a clog within the media 117 begins to form, the water flow will act on the clogging to shift the media 117, resulting with the clog being broken up.

Testing Data and Mathematical Analysis:

Based on laboratory testing data that represents the potential flow of water through and expanded clay media having an average particle size of ⅜". The bed of media was modeled having an area of 20 ft² and a depth of 2.5 ft. The test apparatus was arranged so that the water flow was directed upward through the media bed and out the top. This is an upflow filter configuration. The hydraulic head pressure driving the water flow up through the media was maintained at 1.5 ft.

Media type=⅜" expanded clay

Media bed size=20 ft²

Media depth=2.5 ft

Hydraulic head pressure=1.5 ft

Based on laboratory modeling, the maximum potential water flow through the 20 ft²×2.5 ft media bed of ⅜" expanded clay with a hydraulic head pressure of 1.5 ft is 21.8 cubic feet per second (cfs)

Maximum potential flow through media bed=21.8 cfs

The frictional forces of the media acting on the water flow restricts the maximum potential flow at the given hydraulic head pressure of 1.5 ft. The maximum potential flow through the upflowing conveyance without the media can be expressed using a standard orifice formula below.

$$\text{Orifice flow formula} = (\text{open area})(0.67)\sqrt{64 \times (\text{head pressure})^2} = Q$$

$$Q = \text{Flow Rate expressed in } cfs$$

$$Q = (20)(.67)\sqrt{64 \times (1.5)^2} = 160.8 \ cfs$$

Maximum potential water flow through and orifice of 20 ft² with 1.5 ft of head pressure=160.8 cfs. The frictional forces between the water flow and filtration media reduces the water flow volume by approximately 87.5%.

For water flowing through this upflow filter configuration, restricting the flow at the top of the upflow filter, by means of controlling the water by with an orifice, will not have an effect until the orifice constriction limits the flow to less than 21.8 cfs. The flow rate through the constriction orifice can be determined by the standard orifice formula. The following table was created using the before mentioned upflow filter specifications. The flow rate is determined by either the frictional force of the water flowing through the media, or the constriction of the orifice at the top of the upflow filter. The flow rate determining factor will be lessor of the 2 considerations.

TABLE 1

| Orifice Area (in²) | Orifice Area (ft²) | Head (ft) | Flow Rate (cfs) | Flow Rate (gal/min) | Contact Time Increase (%) |
|---|---|---|---|---|---|
| 2880.00 | 20.00 | 1.50 | 21.800 | 9,783.84 | 0.00 |
| 2160.00 | 15.00 | 1.50 | 21.800 | 9,783.84 | 0.00 |
| 1440.00 | 10.00 | 1.50 | 21.800 | 9,783.84 | 0.00 |
| 720.00 | 5.00 | 1.50 | 21.800 | 9,783.84 | 0.00 |
| 432.00 | 3.00 | 1.50 | 21.800 | 9,783.84 | 0.00 |
| 390.24 | 2.71 | 1.50 | 21.788 | 9,778.63 | 0.05 |
| 360.00 | 2.50 | 1.50 | 20.100 | 9,020.88 | 8.46 |
| 324.00 | 2.25 | 1.50 | 18.090 | 8,118.79 | 20.51 |
| 288.00 | 2.00 | 1.50 | 16.080 | 7,216.70 | 35.57 |
| 252.00 | 1.75 | 1.50 | 14.070 | 6,314.62 | 54.94 |
| 216.00 | 1.50 | 1.50 | 12.060 | 5,412.53 | 80.76 |
| 180.00 | 1.25 | 1.50 | 10.050 | 4,510.44 | 116.92 |
| 144.00 | 1.00 | 1.50 | 8.040 | 3,608.35 | 171.14 |
| 108.00 | 0.75 | 1.50 | 6.030 | 2,706.26 | 261.53 |
| 72.00 | 0.50 | 1.50 | 4.020 | 1,804.18 | 442.29 |
| 36.00 | 0.25 | 1.50 | 2.010 | 902.09 | 984.58 |
| 28.80 | 0.20 | 1.50 | 1.608 | 721.67 | 1255.72 |
| 21.60 | 0.15 | 1.50 | 1.206 | 541.25 | 1707.63 |
| 14.40 | 0.10 | 1.50 | 0.804 | 360.84 | 2611.44 |
| 7.20 | 0.05 | 1.50 | 0.402 | 180.42 | 5322.89 |

With an orifice of approximately 2.71 ft² the orifice becomes the rate determining factor for water flow rate. For orifice sizes greater than 2.71 ft² the frictional forces between the water flow and filtration media determines the flow rate, not the orifice on top of the upflow filter.

FIG. 39 is a graph that plots the orifice area on top of the upflow filter vs the total potential flow of the upflow filter.

FIG. 40 is a graph that also plots the orifice area on top of the upflow filter vs the total potential flow of the upflow filter. FIG. 40 presents the same information as FIG. 39, however, the x axis is of Graph 40 truncated.

A critical element of any media filtration system is for the water flow to have contact time with the media. Greater contact time will result in higher removal efficiencies of pollutants. FIG. 41 is a graph that plots the area of the orifice on top of the upflow filter to the increase in contact time the water has with the media as a result of the orifice restricted flow.

FIG. 42 is a graph that also plots the orifice area on top of the upflow filter vs the percent increase in contact time between the water and the filtration media. FIG. 42 presents the same information as FIG. 41, however, the x axis is of FIG. 42 truncated.

Figure 11:
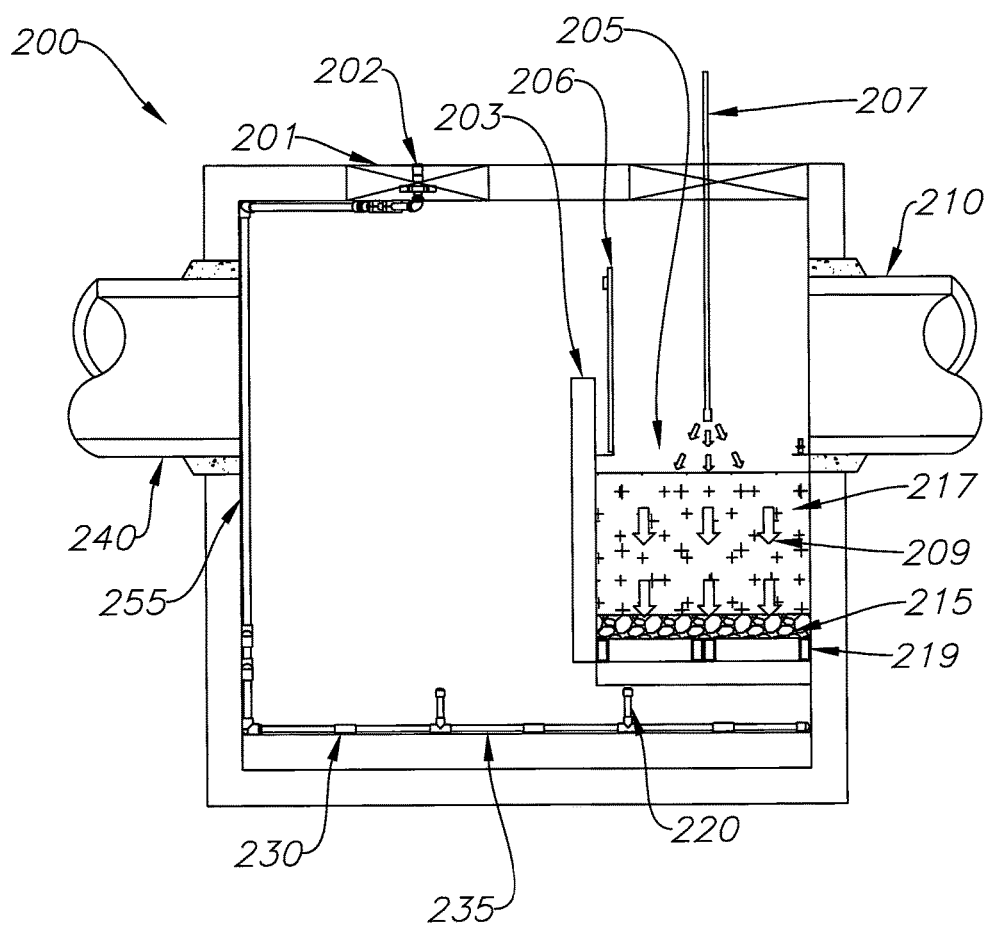
FIG. 11 is another side view of the upflow media filter baffle box/vault of FIG. 3 with one open lid and servicing hose and back-flush directional flow.
Figure 12:
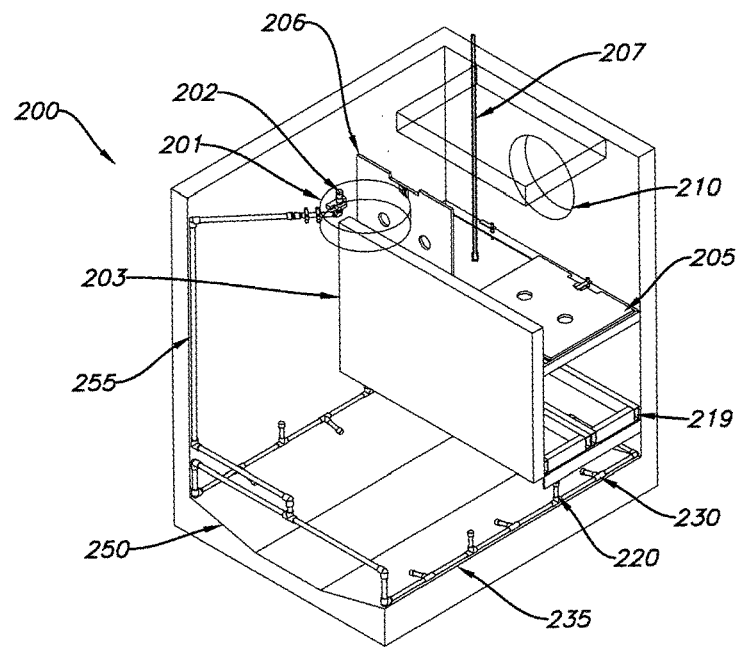
FIG. 12 is an upper partial front right perspective view of the upflow media filter baffle box/vault of FIG. 11 without gravel/rock layer, media and screen.
Figure 13:
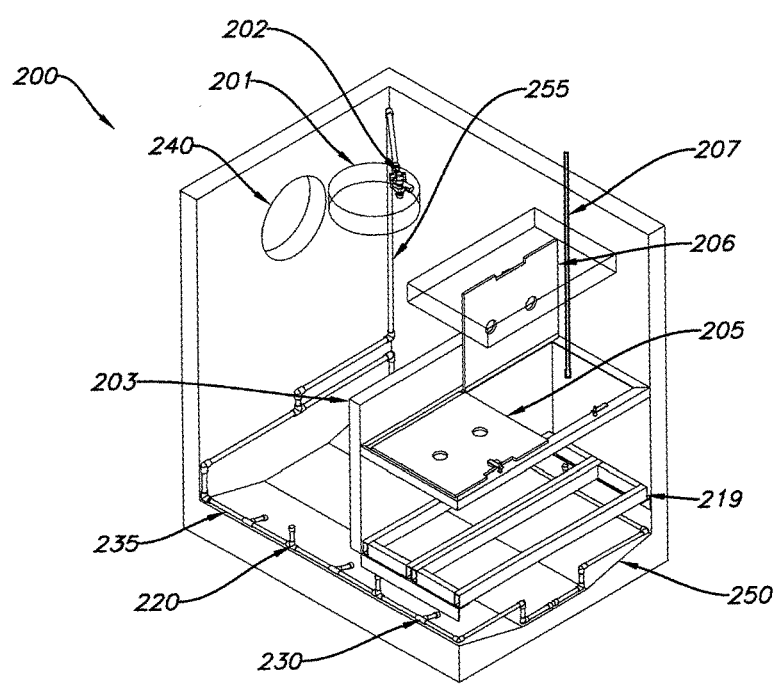
FIG. 13 is an upper partial rear left perspective view of the upflow media filter baffle box/vault of FIG. 11 without gravel/rock layer, media and screen.
Figure 14:
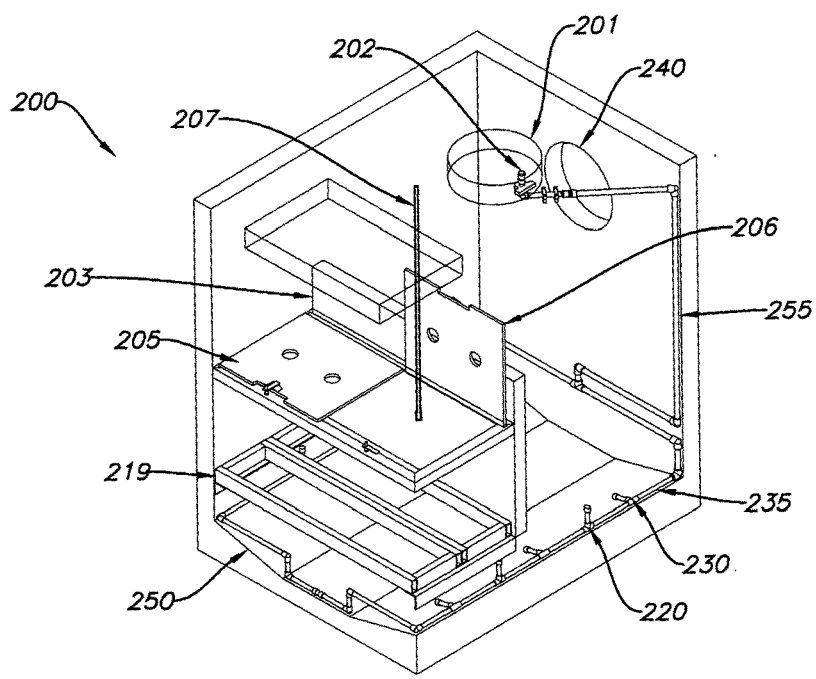
FIG. 14 is an upper partial rear right perspective view of the upflow media filter baffle box/vault of FIG. 11 without gravel/rock layer, media and screen.
Figure 15:
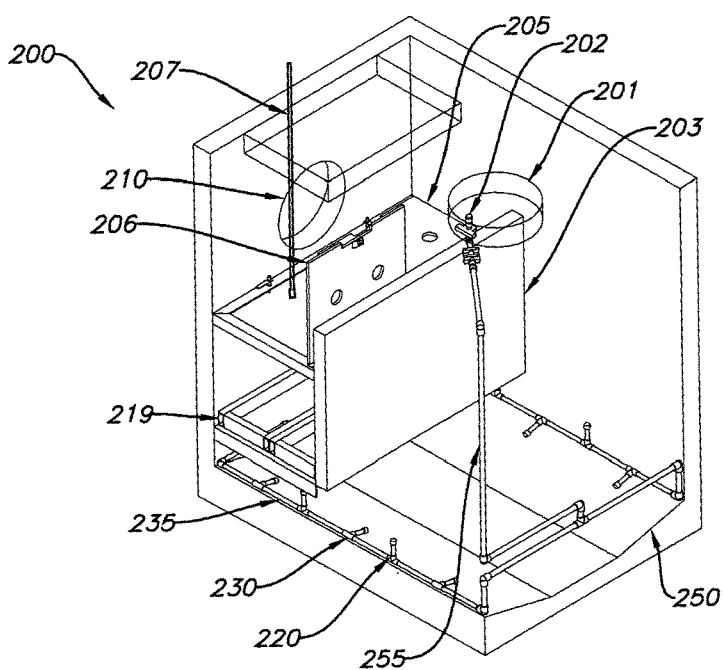
FIG. 15 is an upper partial front left perspective view of the upflow media filter baffle box/vault of FIG. 11 without gravel/rock layer, media and screen.

Second Embodiment Upflow Media Filter with Plastic Lids with Screened Orifice Opened for Servicing FIG. 11 is another side view of the upflow media filter baffle box/vault 200 of FIG. 3 with one open lid 206 and servicing hose 207 and back-flush directional flow. FIG. 12 is an upper partial front right perspective view of the upflow media filter baffle box/vault 200 of FIG. 11 without gravel/rock layer 215, media 217 and screen 219. FIG. 13 is an upper partial rear left perspective view of the upflow media filter baffle box/vault 200 of FIG. 11 without gravel/rock layer 215, media 217 and screen 219. FIG. 14 is an upper partial rear right perspective view of the upflow media filter baffle box/vault 200 of FIG. 11 without gravel/rock layer 215, media 217 and screen 219. FIG. 15 is an upper partial front left perspective view of the upflow media filter baffle box/vault 200 of FIG. 11 without gravel/rock layer 215, media 217 and screen 219.

Referring to FIGS. 11-15, components 202, 203, 204, 205, 206, 210, 215, 217, 219, 220, 230, 240, 250, 255 are the same as previously described components 102, 103, 104, 105, 106, 110, 115, 117, 119, 120, 130, 140, 150, 155, respectively in previous FIGURES.

Lids on the Upflow Filter:

Referring to FIGS. 11-15, the lid 205 or lids 205 on the upflow filter can be either hinged or removed to expose the top of the media bed 217. The lid 205 or lids 205 can be accessed from outside the box/vault 200 of the storm water treatment system which avoids having a service technician to deal with confined space protocols. As a part of servicing the treatment system, after the lids 205 are opened, the filtration media 217 can be backflushed by a technician from outside the vault. Solids will wash out of the media 217 during the backflushing and fall into the lower settling zone where they will settle out across the floor of the vault. After the filtration media is adequately backflushed, the lids 205 on the top of the upflow filter can be closed and secured.

Referring to FIGS. 11-15, a backwash servicing procedure can be performed by service technicians from outside the box/vault 200. Access covers in access points 201 can be opened. A spray service wand 207 can be used for washing using water at high pressure, and a separate high pressure water supply that will be used to activate the service spray system and backflush the filtration media 217.

Before the spray wand is used, the lid 205 or lids 205 on top of the upflow filter system 100 can be opened 206 by hinges or be separately removed to expose the top of the filtration media 217.

Next, a service technician outside of the box/vault 200 can use the spray wand 207 from a vacuum service truck to backflush in the direction of arrow 209 the filtration media 217. The service technician should work across the top of the media 217 so as to not miss any portion of the filtration media 217. The water from the spray wand 207 and the solids washed out of the filtration media 217 will fall into the lower settling zone of the storm water treatment system 200.

Once the filtration media 217 has been adequately backflushed, close the lid 206 or lids 206 on top of the upflow filter and lock them down so that they won't accidently open.

Third Embodiment Upflow Media Filter with Floating Skimmer

FIG. 16 is a top view of the upflow media filter baffle box/vault/system 300 of FIG. 1 with floating skimmer 311. FIG. 17 is an inflow view of the upflow media filter baffle box/vault 300 of FIG. 16 along arrow 17X FIG. 18 is side cross-sectional view of the upflow media filter baffle box/vault 300 of FIG. 16 along arrow 18X. FIG. 19 is an outflow view of the inflow media filter baffle box/vault 300 of FIG. 16 along arrow 19X. FIG. 20 is an upper partial front right perspective view of inflow media filter baffle box/vault 300 of FIG. 16 without gravel/rock layer 315, media 317 and bottom screen 319. FIG. 21 is an upper partial rear left perspective view of inflow media filter baffle box/vault 300 of FIG. 16 without gravel/rock layer 315, media 317 and bottom screen 319. FIG. 22 is an upper partial rear right perspective view of inflow media filter baffle box/vault 300 of FIG. 16 without gravel/rock layer 315, media 317 and bottom screen 319. FIG. 23 is an upper partial front left perspective view of inflow media filter baffle box/vault 300 of FIG. 16 without gravel/rock layer 315, media 317 and bottom screen 319.

Referring to FIGS. 16-23, components 301, 302, 303, 304, 305, 308, 310, 315, 317, 319, 320, 330, 335, 340, 350, 355 are the same as and are equivalent to components 202, 203, 204, 205, 206, 210, 215, 217, 219, 220, 230, 240, 250, 255 in FIGS. 11-15 and are the same as previously described components 102, 103, 104, 105, 106, 110, 115, 117, 119, 120, 130, 140, 150, 155, respectively in previous FIGS. 1-10.

The Hydro-Variant Skimmer System:

Referring to FIGS. 16-23, the diversion barrier in the flow restricted storm water filtration system that diverts water flow downward toward a zone below the upflow filter can be either fixed in place such as a baffle 103, 203 in previous FIGURES, or the barrier can be designed to float upward as a floating skimmer 311 when the hydraulic grade line (hgl) reaches an engineered and specified elevation.

The fixed diversion barrier can be either sized so that water flow will never or almost never top the barrier, or the barrier can be sized so that water flow will top the barrier at a much lower elevation. Topping the barrier at a lower elevation will likely result in the barrier being topped more often. The hydrology of the water shed will play an important role in the height of the barrier. A fixed diversion barrier, baffle 303 that is topped by water flow functions as a spillway. It is important to note that the headloss created by a spillway never goes away or reduced when water is flowing over top. When designing spillways engineering the design headloss must be considered to prevent flooding upstream.

If the diversion barrier is designed to float upward as a floating skimmer 311 when the hgl reaches an engineered and specified elevation, the headloss created by the upflow filter can be completely offset. Making use of a diversion barrier 311 that floats will enable media filtration to be placed inline with a storm drain pipe without compromising the hydrology of the water shed. As the barrier floats upward the barrier functions as a skimmer 311 which prevents floatables from passing through the vault.

The floatable skimmer 311 can be a floatable skimmer such as those shown and described in U.S. Pat. Nos. 7,846, 327; 8,034,234; 8,034,236; 8,083,937; 8,231,780 and 9,534, 368 to Happel, the inventor of the subject patent application, which are all incorporated by reference in their entirety.

When the diversion barrier 311 floats upward the treatment from the media filtration will end as water flow bypasses between the bottom of the barrier and the top of the media filter. However, because many times more water flow can be passed under a floating barrier than over top of a spillway, the headloss created with the media filter earlier in the rain event is reduced and goes away as the hgl continues to rise. However, the most polluted water flow occurs early in the rain event. So before the floating barrier begins to rise, the media filter will provide treatment for the most polluted portion of the rain event.

In addition, most rain events will not be intense enough to raise the hgl in the flow restricted storm water filtration system to an elevation that will enable the diversion barrier to float. For example, in Tallahassee Fla., a city within the rainiest region in Florida, 44% of all rain events are less than 0.1 inches of rainfall. For all locations around the entire United States, most rain events to not yield high levels of rain fall.

Lid Lock Detail

FIG. 24 is an enlarged partial top view of the lid lock components of the previous embodiments. FIG. 25 is a front view of the lid lock components of FIG. 24 along arrow 25X. FIG. 26 is a side view of the lid lock components of FIG. 24 along arrow 26X. FIG. 27 is a top partial front right view of the lock components of FIG. 24 in a lock position. FIG. 28 is another top partial front right view of the lock components of FIG. 27 in an unlocked position.

Referring to FIGS. 24-28, plastic lid 405 with screened orifices corresponds to the top lid(s) 105, 205, 305, shown and described in previous FIGS. 1-23.

Top lid 405 can either be hinged as previously described, and on an opposite side include a pivotal latch 404. In a down position the top lid can rest on an edge of a lid landing 403. The lock/latch 404 which pivot between a lock position where the latch 404 is abutting against a catch 406 which locks the top lid 405 in place. The lock latch 404 can rotate clockwise approximately 180 to an open position, which allows the top lid to lift up to access the media 117, 217, 317 shown and described in previous FIGS. 1-23.

Servicing System and Procedure:

A critical element for any storm water treatment system is being able to service the system quickly and easily. The longer it takes to service a storm water treatment system, the more money it will cost for both manpower and service equipment. In addition, there is an element of servicing that is centered around the safety of the service technicians. For a service technician to enter a storm water treatment vault, OSHA requires the service technicians to adhere to protocol referred to as the confined space protocol. The protocol requires the service technician that enters the vault to be equipped with a significant amount of specialized equipment. The confined space protocol also requires more personnel to be involved in the process, and a detailed report that a confined space entry took place must be submitted to an administrator. If the service technicians can complete the servicing without having to enter the vault, the additional manpower and time spent can be avoided.

Spray Bars:

The servicing system for removing debris that has settled into the lower settling zone includes a spray system and sloped floors 150, 250, 350 shown in FIGS. 1-23. The spray system enables water to be injected into the storm water treatment system at high pressure from outside the vault. Adjacent to the access opening 101, 201, 301 shown in FIGS. 1-23, in the top of the storm water treatment system can be an attachment fitting 102, 202, 302 (FIGS. 1-23) for a vacuum service truck to connect onto. A pipe or hose will convey high pressure water flow from the service truck to the spray system in the lower settling chamber.

As a part of the spray system water lines 155, 255, 355 FIGS. 1-23 can direct pressurized water to spray bars 135, 235, 335 FIGS. 1-23 along the floor and vertical walls of the treatment system which can have water nozzles along the length of the spray bar or bars 135, 235, 335 FIGS. 1-23 that are aimed parallel with the sloped floors 150, 250, 350 FIGS. 1-23.

These nozzles can operate at high pressure and will drill into the layer of solids that have settled into the settling zone adjacent to the sloped floors 150, 250, 350 FIGS. 1-23 inside the box/vaults. The layer of solids can be liquefied from the underside and flushed toward the center of the settling zone where a vacuum from a service vehicle can remove the solids from the vault.

Aiming Levers

FIG. 29 is an enlarged partial side view of the aiming lever with spray bar 550 of the preceding FIGURES used to assist in installation of spray bars 550 along corners of the floor of a box/vault. FIG. 30 is another view of the lever and spray bar 550 of FIG. 29 rotated down so the spray direction 520 is parallel with the sloped floor 570. The rotatable lever with spray bar(s) 550 are equivalent to the levers with spray bars 135, 235, 335 shown in FIGS. 1-23.

The sloped floor 570 in FIGS. 29-30 is equivalent to the sloped floors 150, 250, 350, shown and described in reference to FIGS. 1-23.

The floors 150, 250, 350 of the storm water treatment box/vault/systems 100, 200, 300 will be sloped downward and away from the wall or walls 512 of the box/vault 100, 200, 300. Sloping the floors will enable gravity to influence the movement of water and solids toward the center of the settling zone where a vacuum will remove the solids from the vault. Both gravity and the kinetic energy of the water nozzles will direct solids toward the center of the settling zone.

One of the primary objectives of the HydroSlide serving system is to liquefy the sediment from underneath and thrust the debris toward the location in the settling chamber where it can be vacuumed out by a vacuum truck. This is accomplished by using water pumped into the servicing system at high pressure from equipment located outside the vault. Spray bars having a series of nozzles are positioned along the floor of the settling chamber. The water exiting the spray nozzles needs to be traveling at a sufficient velocity so that it can drill into the debris that has settled into the settling chamber. It is also important the nozzles be aimed parallel with the floor of the settling chamber.

If the nozzles of floor spray bars are not aimed parallel with the floor performance deficiencies can occur. If the nozzles are aimed too far upward the water jets will miss much the debris along the floor of the settling chamber. If the nozzles are not able to engage the sediment along the floor it will not be able to thrust this debris toward the location in the settling chamber where it can be vacuumed out. If the nozzles are aimed too low the water jets will hit onto the floor of the settling chamber. When the water jets hit onto the floor the velocity of the water jets are significantly reduced and the water jets will not be able to adequately drill into the debris.

A part of the sprayer servicing system are the sloped floors which aid in conveying debris toward the location in the settling chamber where it can be vacuumed out. A difficulty to overcome is that the angle of the sloped floors vary significantly due to differences in designs and workmanship.

The time that it takes to install the sprayer service system needs to be minimized to avoid added expenses. For example; during a typical installation of a storm water treatment system a lot of heavy equipment and manpower is required, and the time to install treatment system can be very expensive. Having to take extra time to unsure that the nozzles of a spray bar are aimed correctly can create delays along with the extra costs associated with these delays.

Another issue of installation of the sprayer service system can be the skill level of the installation personnel. Having a feature of the service system that reduces the required skill level to install the servicing system correctly will aid with ensuring that all installs are done perfectly correct.

The aiming levers are a part of the floor spray bars and will solve the before mentioned issues. The aiming levers are parallel with the direction of the water jets along the spray bars. The aiming lever serves as physical and visual indicator that ensures that the nozzles are aimed parallel with the floor of the settling chamber. During the manufacturing of the spray bars there is a high level of quality control to ensure that the aiming levers are parallel with the nozzles along the spray bars. The technician installing the spray bars simply needs to make sure the aiming lever is pressed flat onto the floor. This can be accomplished by pushing down on the aiming lever until it hits onto the floor. Regardless of the angle of the floor, when the aiming lever is pressed down onto the floor the nozzles will be parallel with the floor. Because the process is so simple and quick, installation time and the required skill to install is minimized.

Spray Knife

FIG. 31 is a front side view of the inflow medial filter baffle box/vault along the floor showing the sediment debris forming a bridge 695 between side vault walls 612 in the baffle box/vault. FIG. 32 is a side view of the box/vault of FIG. 32 of the sediment debris bridge 695 above the sloped floor 670 with the lever and spray bars 650 rotated down so the spray direction 620 is parallel with the sloped floor 670.

FIG. 33 is another view of FIG. 31 with a vertical spray knife 640 perpendicular to the floor 670 spray bars 650 spraying into the bridged sediment/debris 695 creating a channel and a reduced bridge section 696 having a weakened location above the channel. FIG. 34 is a cross-sectional view of FIG. 33 along arrows 34X.

FIG. 35 is another view of FIG. 33 after the weakened section location 696 above the channel breaks away allowing the sediment/debris to fall to the lower spray bars 650. FIG. 36 is a cross-sectional view of FIG. 35 along arrows 36X.

Referring to FIGS. 31-36, the sloped floor is equivalent to the sloped floors 150, 250, 350, shown and described in FIGS. 1-23. The lever with spray bars 650 are equivalent to the lever with spray bars 235, 235, 335 shown and described in FIGS. 1-23. And the side directional spraying spray knife 640 is equivalent to the spray knife(s) 120, 220, 320 shown and described in FIGS. 1-23.

In addition to the spray bars of the spray system are vertical pipe sections that function as a kind of knife. The knife will slice a vertical cut through the layer of solids in the settling zone of the storm water treatment system.

As debris accumulates in a settling chamber it can become highly compacted. In addition, sediment, leaves, and twigs will become integrated throughout the accumulated debris. The presence of leaves and twigs enhances the general structure of the accumulated debris.

During servicing of the lower settling chambers when the HydroSlide service system is powered on, what often happens to the collected debris is the jets that are aimed along the floor of the chamber will undermine the sediment without the majority of sediment collapsing to the floor. Essentially, what has happened is the structure of the sediment has allowed the jets aimed along the floor to drill through the sediment close to the floor, while the compacted debris above the floor jets bridges between the solid walls of the vault to support the bulk of the debris above the floor jets. When debris bridging occurs the floor jets are not able to engage all the debris.

The knife section of the sprayer system is typically positioned approximately midway between 2 walls within the settling chamber. The knife is a vertical high pressure spray bar having jets aimed horizontally across toward the center of the settling chamber. When the servicing system is powered on the knife will cut a vertical slice through the collected debris. This vertical slice through the debris will work in conjunction with the floor spray bars to cause the structure of the debris to weaken.

The floor spray bars will work to undermine and liquefy the debris from underneath while the knife spray bar slices a vertical cut across the approximate center of the debris. Once the slice from the knife spray bar is adequately complete, the structure within the debris will fail causing the debris to collapse to the floor of the vault. Once the potential for the debris to bridge between the walls of the vault is nullified the floor spray bars will be fully able to liquefy the debris from the underside and flush all the debris toward the point in the chamber where it can be vacuumed out.

Fourth Embodiment Upflow Media Filter with Screen System

FIG. 37 is an upper partial perspective front right view of the media filter box/vault 300B of FIG. 1 with screen system 360, 365 and static baffle skimmer 303. FIG. 37 uses a static wall/baffle 303 to divert the water flow under the upflow filter.

FIG. 38 is an upper partial perspective front right view of the media filter box/vault 300B of FIG. 1 with screen system 360, 365 and floating skimmer 311. The floating skimmer 311 is used for diverting water under the upflow filter.

Referring to FIGS. 37-38, the static baffle 303 is equivalent to the baffle 103, 203 303 shown and described in FIGS. 1-23, and the floating skimmer 303 is the same as the floating skimmer 303 shown and described in FIGS. 17-23.

In this embodiment, the screen system 360 and screen legs 365 can be used in the box/vault 300B. The screen system 360 with screen legs 365 can be the screen system shown and described in U.S. Pat. No. 9,534,368, to Happel, the same inventor as in the subject patent application, which is incorporated by reference in its' entirety.

Servicing Procedure

Servicing to be performed by service technicians from outside the vault housing of the flow restricted storm water filtration system. The required equipment for servicing will be a vacuum service truck. A typical vacuum truck will have both a vacuum system to remove debris from inside the vault, a spray service wand for washing using water at high pressure, and a separate high pressure water supply that will be used to activate the service spray system and backflush the filtration media.

Servicing steps for using the invention can include the following:

Step 1: Open the access covers at the top of the vault.

Step 2: Connect the high pressure water supply of the vacuum truck to the connector for the storm water treatment system's lower service spray system.

Step 3: Vacuum out the water in the vault down to the layer of solids across the floor of the vault.
Step 4: Turn on the high pressure water supply of the vacuum truck to activate the spray system in the lower settling zone, and continue to vacuum out the vault. The spray system will liquefy the solids along the floor of the vault and direct these solids toward the vacuum.
Step 5: Once the solids in the lower settling zone have been removed, turn off the vacuum and the spray system.
Step 6: Open the lid or lids on top of the upflow filter system to expose the top of the filtration media.
Step 7: Using the spray wand from the vacuum service truck, backflush the filtration media. The service technician should work a patter so as to not miss any portion of the filtration media. The water from the spray wand and the solids washed out of the filtration media will fall into the lower settling zone of the storm water treatment system.
Step 8: Once the filtration media has been adequately backflushed, close the lid or lids on top of the upflow filter and lock them down so that they won't accidently open.
Step 9: Turn on the high pressure water supply of the vacuum truck to activate the spay system in the lower settling zone again and turn on the vacuum. At this step, the water and debris being removed from the vault is from the backflushing of the filtration media in the upflow filter.
Step 10: Once all the water and solids have been removed from the lower setting zone again, turn off the vacuum and sprayer system.
Step 11: Disconnect the high pressure water supply of the vacuum truck from the connector for the storm water treatment system's lower service spray system, and withdraw the vacuum line. Close the access covers at the top of the vault.
Servicing is Complete The term "approximately" can be +/-10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An upflow media filter treatment system, comprising:
    a chamber with a first end for inflowing storm water and a second end for passing outflowing treated storm water to exit the chamber, and a floor surface;
    a flow director in the chamber to direct the inflowing storm water to flow downward toward the floor surface of the chamber; and
    a media filter adjacent the second end of the chamber, the media filter comprising a media bed between at least one top lid with flow regulation orifices and a bottom screen, the bottom screen having openings sized to prevent media from falling through the screen and escaping the media bed, the flow regulation orifices each being sized to regulate maximum potential flow volume that is able to pass through the media filter to less than approximately fifty percent of potential flow volume through the bottom screen and the media filter, wherein downward flowing storm water approaching a floor surface in the treatment system is directed to flow upward through the bottom screen and into the media layer followed by passing through the at least one top lid with orifices restricts flow rate of the media treated storm water so inflowing storm water has more contact time with the media layer for cleaning the inflowing storm water.

2. The upflow media filter treatment system of claim 1, wherein flow director includes:
    a fixed baffle.

3. The upflow media filter treatment system of claim 1, wherein the at least one top lid in the media filter includes:
    a hinge for allowing the at least one top lid to fold open for allowing servicing of the media layer.

4. The upflow media filter treatment system of claim 1, wherein the at least one top lid includes:
    a plurality of lids, each with a hinge for allowing each of the plurality of lids to be separately folded open for allowing servicing of the media layer.

5. The upflow media filter treatment system of claim 4, wherein each of the plurality of top lids includes:
    a latch being rotatable between a lock position for locking the plurality of top lids on the media filter, and being rotatable to an unlock position for unlocking the plurality of top lids and allowing the plurality of top lids to be opened to allow for the servicing of the media layer.

6. The upflow media filter treatment system of claim 1, wherein the at least one top lid includes:
    a latch being rotatable between a lock position for locking the at least one top lid on the media filter, and being rotatable to an unlock position for unlocking the at least one top lid and allowing the at least one top lid to be opened to allow for the servicing of the media layer.

7. The upflow media filter treatment system of claim 1, further comprising:
    the floor surface being a sloped floor; and
    a pressure water servicing system adjacent the floor of the treatment system, the pressure water servicing system being used to flush captured debris toward a center of the floor so that debris is washed down the sloped floor to central locations that are easily removable by outside vacuums so that technicians are prevented from entering into the chamber.

8. An upflow media filter treatment system, comprising:
    a chamber with a first end for inflowinq storm water and a second end for passing outflowing treated storm water to exit the chamber, and a floor surface;
    a flow director in the chamber to direct the inflowing storm water to flow downward toward the floor surface of the chamber;
a media filter adjacent the second end of the chamber, the media filter comprising a media layer between at least one top lid with orifices and a bottom screen; and
    screens for each of the orifices in the at least one top lid, wherein downward flowing storm water approaching a floor surface in the treatment system is directed to flow upward through the bottom screen and into the media layer followed by passing through the at least one top lid with orifices restricts flow rate of the media treated storm water so inflowinq storm water has more contact time with the media layer for cleaning the inflowing storm water.

9. The upflow media filter treatment system of claim 8, further comprising:
    a floating skimmer on a fixed baffle.

10. An upflow media filter treatment system, comprising:
a chamber with a first end for inflowing storm water and a second end for passing outflowing treated storm water to exit the chamber, and a floor surface;
a flow director in the chamber to direct the inflowing storm water to flow downward toward the floor surface of the chamber;
a media filter adjacent the second end of the chamber, the media filter comprising a media layer between at least one top lid with orifices and a bottom screen, wherein downward flowing storm water approaching a floor surface in the treatment system is directed to flow upward through the bottom screen and into the media layer followed by passing through the at least one top lid with orifices restricts flow rate of the media treated storm water so inflowing storm water has more contact time with the media layer for cleaning the inflowing storm water;
the floor surface being a sloped floor; and
a pressure water servicing system adjacent the sloped floor of the treatment system, the pressure water servicing system being used to flush captured debris toward a center of the floor so that debris is washed down the sloped floor to central locations that are easily removable by outside vacuums so that technicians are prevented from entering into chamber,
wherein the pressure water servicing system includes:
spray heads which pivot to be parallel to the sloped floor; and
an alignment lever that allows for the spray heads to pivot to be parallel to the sloped floor.

11. The upflow media filter treatment system of claim 10, wherein the pressure water servicing system further includes:
water pressure lines along bases of walls of the chamber; and
vertical spray heads perpendicular to the water pressure lines for cutting into debris bridges formed in the chamber.

12. An upflow media filter treatment system, comprising:
a chamber with a first end for inflowing storm water and a second end for passing outflowing treated storm water to exit the chamber, and a floor surface;
a flow director in the chamber to direct the inflowing storm water to flow downward toward the floor surface of the chamber;
a media filter adjacent the second end of the chamber, the media filter comprising a media layer between at least one top lid with orifices and a bottom screen, wherein downward flowing storm water approaching a floor surface in the treatment system is directed to flow upward through the bottom screen and into the media layer followed by passing through the at least one top lid with orifices restricts flow rate of the media treated storm water so inflowing storm water has more contact time with the media layer for cleaning the inflowing storm water;
the at least one top lid in the media filter includes a hinge for allowing the at least one top lid to fold open for allowing servicing of the media layer; and
water pressure sources directing pressurized water through the media filter when the at least one top lid is folded open to allow for backwashing of the media filter without having to remove the media layer from the media filter.

13. An upflow media filter treatment system, comprising:
a chamber with a first end for inflowing storm water and a second end for passing outflowing treated storm water to exit the chamber, and a floor surface;
a flow director in the chamber to direct the inflowing storm water to flow downward toward the floor surface of the chamber;
a media filter adjacent the second end of the chamber, the media filter comprising a media layer between at least one top lid with orifices and a bottom screen, wherein downward flowing storm water approaching a floor surface in the treatment system is directed to flow upward through the bottom screen and into the media layer followed by passing through the at least one top lid with orifices restricts flow rate of the media treated storm water so inflowing storm water has more contact time with the media layer for cleaning the inflowing storm water; and
a gap between a top of the media layer and a bottom of the at least one lid, wherein the gap allows for horizontal conveyance or water flow between the top of the media layer and the orifices in the at least one lid, so that the orifices determine a rate of volume flow passing through the media filter, and the gap allowing for the media layer to shift and have movement from upward flowing water, the movement of the media layer helping preventing and breaking up clogs being formed in the media layer.

14. The upflow media filter treatment system of claim 13, wherein the gap includes: a thickness of approximately 2 inches.

15. A method of cleaning a media filter in a treatment system without having to remove media from the media filter, comprising the steps of:
providing a media filter that includes a media layer between at least one top lid with orifices and a bottom screen;
installing the media filter in a storm water treatment chamber adjacent an outflow port from the chamber;
receiving inflowing storm water into an inflow port into the chamber;
directing the inflowing storm water downward into the chamber;
directing the downward directed storm water to flow upward through the bottom screen, through the media layer and out of the at least one lid to pass through the outflow port of the chamber;
providing a water pressure source outside of the chamber;
opening the at least one top lid; and
backwashing the media layer after opening the at least one lid to clean the media layer, without having to remove the media layer from the media filter.

16. The method of claim 15, wherein the step of providing the media filter includes the step of:
providing the at least one top lid with a hinge.

17. A method of cleaning a water treatment system, comprising the steps of:
providing a sloped floor in a water treatment chamber;
providing a pressure water servicing system adjacent the floor of the treatment system;
providing pivotal spray heads attached to the pressure water servicing system, the pivotal spray heads having alignment levers which allows the spray heads to pivot downward to be parallel to the sloped floor; and
providing vertical spray heads attached to the pressure water servicing system, the vertical spray heads being perpendicular to the pressure water servicing system adjacent to the sloped floor, wherein the pivotal spray heads and the vertical spray heads being used to flush captured debris toward a center of the floor so that debris is washed down the sloped floor to central locations that are easily removable by vacuums outside of the chamber, and the vertical spray heads being used for cutting into debris bridges formed in the chamber.

18. The method of claim 17, further comprising the steps of:

providing a media filter that includes a media layer between at least one top lid with orifices and a bottom screen;

installing the media filter in the chamber adjacent an outflow port from the chamber;

receiving inflowing storm water into an inflow port into the chamber;

directing the inflowing storm water downward into the chamber;

directing the downward directed storm water to flow upward through the bottom screen, through the media layer and out of the at least one lid to pass through the outflow port of the chamber.

19. The method of claim 18, further comprising the steps of:

opening the at least one top lid; and backwashing the media layer after opening the at least one lid to clean the media layer, without having to remove the media layer from the media filter.

20. The method of claim 19, further comprising the step of:

providing a hinge for the at least one top lid.

\* \* \* \* \*